United States Patent
Schmidt et al.

(10) Patent No.: US 12,287,502 B2
(45) Date of Patent: Apr. 29, 2025

(54) COATED SUBSTRATE COMPRISING ELECTRICALLY CONDUCTIVE PARTICLES AND DRIED AQUEOUS DISPERSION OF ORGANIC POLYMER

(71) Applicant: 3M INNOVATIVE PROPERTIES COMPANY, St. Paul, MN (US)

(72) Inventors: Daniel J. Schmidt, Woodbury, MN (US); Kevin W. Gotrik, Hudson, WI (US); James E. Lockridge, St. Paul, MN (US); Caleb T. Nelson, Woodbury, MN (US); Bradley L. Givot, St. Paul, MN (US); Morgan A. Priolo, Woodbury, MN (US); Luke A. Schroeder, Maplewood, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 667 days.

(21) Appl. No.: 17/596,333

(22) PCT Filed: Jun. 3, 2020

(86) PCT No.: PCT/IB2020/055245
§ 371 (c)(1),
(2) Date: Dec. 8, 2021

(87) PCT Pub. No.: WO2020/250090
PCT Pub. Date: Dec. 17, 2020

(65) Prior Publication Data
US 2022/0252770 A1  Aug. 11, 2022

Related U.S. Application Data

(60) Provisional application No. 62/860,418, filed on Jun. 12, 2019.

(51) Int. Cl.
*G06F 3/041* (2006.01)
*G02B 1/04* (2006.01)
(Continued)

(52) U.S. Cl.
CPC ............... *G02B 5/208* (2013.01); *G02B 1/04* (2013.01); *G02B 5/003* (2013.01); *G02B 5/206* (2013.01);
(Continued)

(58) Field of Classification Search
CPC ........ G02B 27/30; G02B 5/208; G02B 5/003; G02F 3/041; G06F 3/0412; G06F 2203/04103
See application file for complete search history.

(56) References Cited

U.S. PATENT DOCUMENTS 3,524,789 A   8/1970  Olsen
4,601,861 A   7/1986  Pricone
(Continued)

FOREIGN PATENT DOCUMENTS

CN   105647086   6/2016
CN   106928842   7/2017
(Continued)

OTHER PUBLICATIONS

Istanbullu, "Development and characterization of novel polyurethane films impregnated with tolfenamic acid for thereutic applications", Biomed Research International, 2013, 9 pages.
(Continued)

Primary Examiner — Ryan D Howard
(74) Attorney, Agent, or Firm — Jeffrey M. Olofson

(57) ABSTRACT

A light control film is described comprising a light input surface and alight output surface opposite the light input surface; alternating transmissive regions and absorptive regions disposed between the light input surface and the
(Continued)

light output surface, wherein the absorptive regions comprise light-absorbing or light-reflecting particles and a dried aqueous dispersion of an organic polymer. The light control film can have improved on-axis transmission in combination with sufficiently high sheet resistance such that the film does not detract from the responsiveness of a touch screen of an electronic device. Also described is a coated article and method of making.

17 Claims, 8 Drawing Sheets

(51) Int. Cl.
*G02B 5/00* (2006.01)
*G02B 5/20* (2006.01)
*G02B 27/30* (2006.01)
*B82Y 20/00* (2011.01)

(52) U.S. Cl.
CPC ......... *B82Y 20/00* (2013.01); *G02B 2207/101* (2013.01)

(56) References Cited

U.S. PATENT DOCUMENTS

| | | | |
|---|---|---|---|
| 5,486,949 A | 1/1996 | Schrenk |
| 5,612,820 A | 3/1997 | Schrenk |
| 5,783,120 A | 7/1998 | Ouderkirk |
| 5,825,543 A | 10/1998 | Ouderkirk |
| 5,828,488 A | 10/1998 | Ouderkirk |
| 5,855,820 A | 1/1999 | Chan |
| 5,882,774 A | 3/1999 | Jonza |
| 6,111,696 A | 8/2000 | Allen |
| 6,398,370 B1 | 6/2002 | Chiu |
| 6,531,230 B1 | 3/2003 | Weber |
| 7,018,713 B2 | 3/2006 | Padiyath |
| 7,140,741 B2 | 11/2006 | Fleming |
| 7,173,778 B2 | 2/2007 | Jing |
| 7,267,850 B2 | 9/2007 | Coggio |
| 7,467,873 B2 | 12/2008 | Clarke |
| 7,486,019 B2 | 2/2009 | Padiyath |
| 7,575,847 B2 | 8/2009 | Jing |
| 8,012,567 B2 | 9/2011 | Gaides |
| 8,013,567 B2 | 9/2011 | Windsor |
| 8,096,667 B2 | 1/2012 | Boyd |
| 8,213,082 B2 | 7/2012 | Gaides |
| 8,234,998 B2 | 8/2012 | Krogman |
| 8,313,798 B2 | 11/2012 | Nogueira |
| 8,460,568 B2 | 6/2013 | David |
| 8,503,122 B2 | 8/2013 | Liu |
| 9,335,449 B2 | 5/2016 | Gaides |
| 9,453,949 B2 | 9/2016 | Nand |
| 9,519,080 B2 | 12/2016 | Cok |
| 9,630,384 B2 | 4/2017 | Haak |
| 9,829,604 B2 | 11/2017 | Schmidt |
| 2009/0104445 A1 | 4/2009 | Inoue |
| 2011/0064936 A1 | 3/2011 | Hammond-Cunningham |
| 2014/0232960 A1 | 4/2014 | Schwartz |
| 2015/0109674 A1 | 4/2015 | Cok |
| 2017/0121565 A1 | 5/2017 | Yasui |
| 2018/0052263 A1 | 2/2018 | Chen |

FOREIGN PATENT DOCUMENTS

| | | |
|---|---|---|
| CN | 106947306 | 7/2017 |
| CN | 109201438 | 1/2019 |
| EP | 1659441 | 5/2006 |
| JP | 6172661 | 6/1994 |
| JP | 2001084569 | 3/2001 |
| JP | 2014224174 | 12/2014 |
| KR | 100673034 | 1/2007 |
| WO | WO 2006-025956 | 3/2006 |
| WO | WO 2006-025992 | 3/2006 |
| WO | WO 2006-102383 | 9/2006 |
| WO | 2009/140392 | 11/2009 |
| WO | WO 2010-090924 | 8/2010 |
| WO | WO 2015-095317 | 6/2015 |
| WO | WO 2019-064108 | 4/2019 |
| WO | WO 2019-118589 | 6/2019 |
| WO | WO 2019-118685 | 6/2019 |
| WO | WO 2020-026139 | 2/2020 |

OTHER PUBLICATIONS

Krogman, "Automated Process for Improved Uniformity and Versatility of Layer-by-Layer Deposition", Langmuir, 2007, vol. 23, pp. 3137-3141.

International Search report for PCT International Application No. PCT/IB2020/055245 mailed on Oct. 21, 2020, 7 pages.

COATED SUBSTRATE COMPRISING ELECTRICALLY CONDUCTIVE PARTICLES AND DRIED AQUEOUS DISPERSION OF ORGANIC POLYMER

BRIEF DESCRIPTION OF THE DRAWINGS

FIG. 1b depicts the polar cut-off viewing angle of the light control film of FIG. 1a.

SUMMARY

In order to make thin coatings comprising, the particles typically have a particle size less than the thickness of the coating. It has been found that small electrically conducting particles, such as carbon black can interact, reducing the sheet resistance.

In one embodiment, a light control film is described comprising a light input surface and a light output surface opposite the light input surface; alternating transmissive regions and absorptive regions disposed between the light input surface and the light output surface, wherein the absorptive regions comprise light-absorbing or light-reflecting particles and a dried aqueous dispersion of an organic polymer. The light control film can have improved on-axis transmission in combination with sufficiently high sheet resistance such that the film does not detract from the responsiveness of a touch screen of an electronic device.

In another embodiment, a coated article is described comprising a non-metallic substrate; and a coating having a thickness less than 2, 1.5, or 1 micron wherein the coating comprises electrically conductive particles and a dried aqueous dispersion of an organic polymer, wherein the coating has a sheet resistance of greater than $1\times10^7$, $5\times10^7$, $1\times10^8$, $5\times10^8$, $1\times10^9$ when applied to glass at a thickness of 500 nm. In some embodiments, the substrate comprises a (e.g. non-conductive) glass or an organic polymeric material. In some embodiments, the electrically conductive particles comprise carbon.

In another embodiment, method of making a coated article, such as a light control film is described comprising providing a non-metallic substrate; coating the substrate with an aqueous dispersion of an organic polymer and electrically conductive particles at a dried thickness of less than 2, 1.5, or 1 micron. In some embodiments, the substrate is a microstructured film comprising a plurality of light transmissive regions alternated with channels, wherein the microstructured film has a surface defined by a top surface and side walls of the light transmissive regions and a bottom surface of the channels. In some embodiments, the method comprises applying the coating via layer-by layer self-assembly coating to the surface. In some embodiments, the method further comprises removing (e.g. such as by ion etching) at least a portion of the coating from the top surface of the light transmissive regions and bottom surface of the channels.

DETAILED DESCRIPTION

Figure 1A:
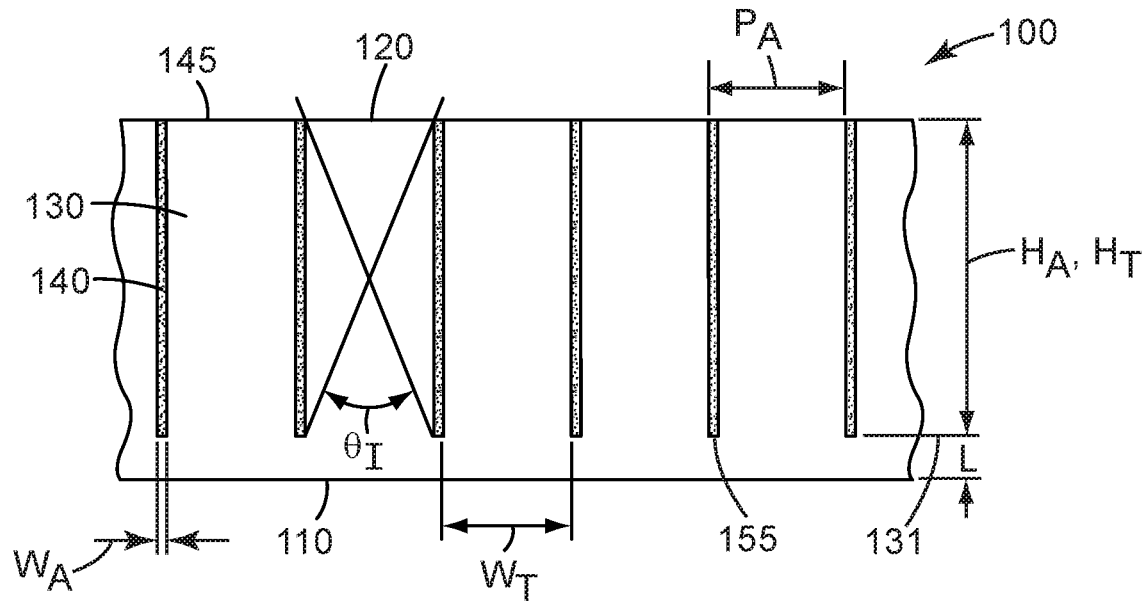
FIG. 1a is a cross-sectional view of an embodied light control film.

In one embodiment, a light control film ("LCF") is described. With reference to FIG. 1a, a cross-sectional view of an embodied LCF 100, the LCF comprises a light output surface 120 and an opposing light input surface 110. The light output surface 120 is typically parallel to the light input surface 110. LCF 100 includes alternating transmissive regions 130 and absorptive regions 140 disposed between the light output surface 120 and a light input surface 110.

In one embodiment, as depicted in FIG. 1a, the transmissive regions 130 are typically integral with a land region "L", meaning that there is no interface between the land region and the base portion 131 of the transmissive regions 130. Alternatively, LCF may lack such land region L or an interface may be present between the land region, L, and transmissive regions 130. When present, the land region is disposed between the alternating transmissive regions 130 and absorptive regions 140 and light input surface 110.

Alternatively, in another embodiment, surface 120 may be the light input surface and surface 110 may be the light output surface. In this embodiment, the land region is disposed between the alternating transmissive regions 130 and absorptive regions 140 and light output surface.

The transmissive regions 130 can be defined by a width "$W_T$". Excluding the land region "L", the transmissive regions 130 typically have nominally the same height as the absorptive regions 140. In typical embodiments, the height of the absorptive regions, $H_A$, is at least 30, 40, 50, 60, 70, 80, 90 or 100 microns. In some embodiments, the height is no greater than 200, 190, 180, 170, 160, or 150 microns. In some embodiments, the height is no greater than 140, 130, 120, 110, or 100 microns. The LCF typically comprises a plurality of transmissive regions having nominally the same height and width. In some embodiments, the transmissive regions have a height, "$H_T$", a maximum width at its widest portion, "$W_T$", and an aspect ratio, $H_T/W_T$, of at least 1.75. In some embodiments, $H_T/W_T$ is at least 2.0, 2.5, 3.0, 3.5, 4.0, 4.5 or 5.0. In other embodiments, the aspect ratio of the transmissive regions is at least 6, 7, 8, 9, 10. In other embodiments, the aspect ratio of the transmissive regions is at least 15, 20, 25, 30, 35, 40, 45, or 50.

Absorptive regions 140 have a height "$H_A$" defined by the distance between the bottom surface 155 and top surface 145, such top and bottom surfaces typically being parallel to the light output surface 120 and a light input surface 110. The absorptive regions 140 have a maximum width "$W_A$" and are spaced apart along surface light output surface 120 by a pitch "$P_A$". The absorptive regions also have a length "LA" as depicted in perspective views of FIG. 5. The width is typically the smallest dimension. The height is typically greater than the width. The length is typically the greatest dimension. In some embodiments, the length can span the entire length of a piece of film or span the length of an entire roll of film.

The width of the absorptive regions, $W_A$, at the base (i.e. adjacent to bottom surface 155) is typically nominally the same as the width of the absorptive regions adjacent the top surface 145. However, when the width of the absorptive regions at the base differs from the width adjacent the top surface, the width is defined by the maximum width. The maximum width of a plurality of absorptive regions can be averaged for an area of interest, such as an area in which the transmission (e.g. brightness) is measured. The LCF typically comprises a plurality of absorptive regions having nominally the same height and width. In typical embodiments, the absorptive regions generally have a width no greater than 10, 9, 8, 7, 6, 5, 4, 3, 2, or 1 micron. In some embodiments, the absorptive regions generally have a width no greater than 900, 800, 700, 600, or 500 nanometers. In some embodiments, the absorptive regions have a width of at least 50, 60, 70, 80, 90, or 100 nanometers. The width of the absorptive regions is typically parallel to light input surface and a height orthogonal to the light input surface.

An absorptive region can be defined by an aspect ratio, the height of the absorptive region divided by the maximum width of the absorptive region ($H_A/W_A$). In some embodiments, the aspect ratio of the absorptive regions is at least 1, 2, 3, 4, 5, 6, 7, 8, 9, or 10. In favored embodiments, the height and width of the absorptive region(s) are selected such that the absorptive region(s) have an even higher aspect ratio. In some embodiments, the aspect ratio of the absorptive regions is at least 15, 20, 25, 30, 35, 40, 45, 50, 55, 60, 65, 70, 75, 80, 85, 90, 95 or 100. In other embodiments, the aspect ratio of the absorptive regions is at least 200, 300, 400, or 500. The aspect ratio can range up to 10,000 or greater. In some embodiments, the aspect ratio is no greater than 9,000; 8,000; 7,000; 6,000, 5,000; 4,000, 3000; 2,000, or 1,000.

Figure 1B:
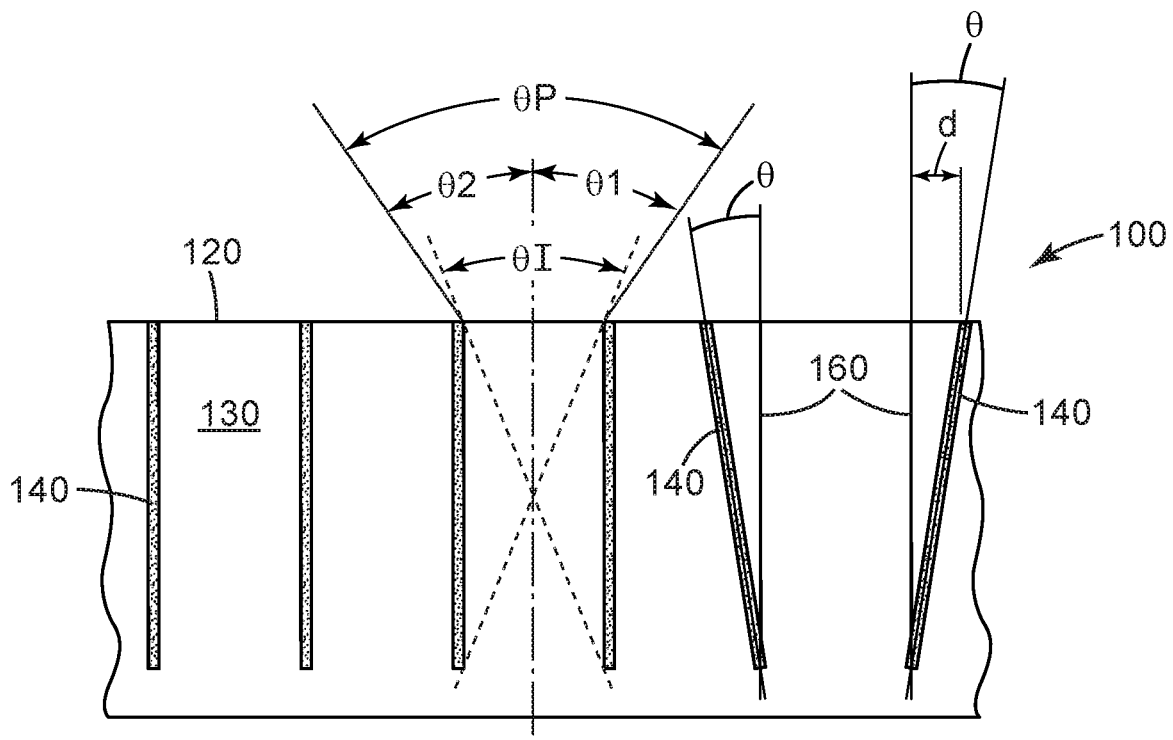

As shown in FIG. 1b, LCF 100 includes alternating transmissive regions 130 and absorptive regions 140, and an interface 150 between transmissive regions 130 and absorptive regions 140. Interface 150 forms a wall angle θ with line 160 that is perpendicular to light output surface 120.

Larger wall angles θ decrease transmission at normal incidence or in other words a viewing angle of 0 degrees. Smaller wall angles are preferred such that the transmission of light at normal incidence can be made as large as possible. In some embodiments, the wall angle θ is less than 10, 9, 8, 7, 6, or 5 degrees. In some embodiments, the wall angle is no greater than 2.5, 2.0. 1.5, 1.0, 0.5, or 0.1 degrees. In some embodiments, the wall angle is zero or approaching zero. When the wall angle is zero, the angle between the absorptive regions and light output surface 120 is 90 degrees. Depending on the wall angle, the transmissive regions can have a rectangular or trapezoidal cross-section.

The transmission (e.g. brightness of visible light) can be increased when incident light undergoes total internal reflection (TIR) from the interface between the absorptive and transmissive regions. Whether a light ray will undergo TIR or not, can be determined from the incidence angle with the interface, and the difference in refractive index of the materials of the transmissive and absorptive regions.

As shown in FIG. 1b, transmissive regions 130 between absorptive regions 140 have an interface angle $θ_I$ defined by the geometry of alternating transmissive regions 130 and absorptive regions. As depicted in FIGS. 1a and 1b, the interface angle $θ_I$ can be defined by the intersection of two lines. The first line extends from a first point, defined by the bottom surface and the side wall surface of a first absorptive region, and a second point defined by the top surface and side wall surface of the nearest second absorptive region. The second line extends from a first point, defined by the top surface and the side wall surface of the first absorptive region, and a second point, defined by the bottom surface and side wall surface of the second absorptive region.

The polar cut-off viewing angle θP is equal to the sum of a polar cut-off viewing half angle θ1 and a polar cut-off viewing half angle θ2 each of which are measured from the normal to light input surface 110. In typical embodiments, the polar cut-off viewing angle θP is symmetric, and polar cut-off viewing half angle θ1 is equal to polar viewing half angle θ2. Alternatively, the polar cut-off viewing angle θP can be asymmetric, and polar cut-off viewing half angle θ1 is not equal to polar cut-off viewing half angle θ2.

Figure 4:
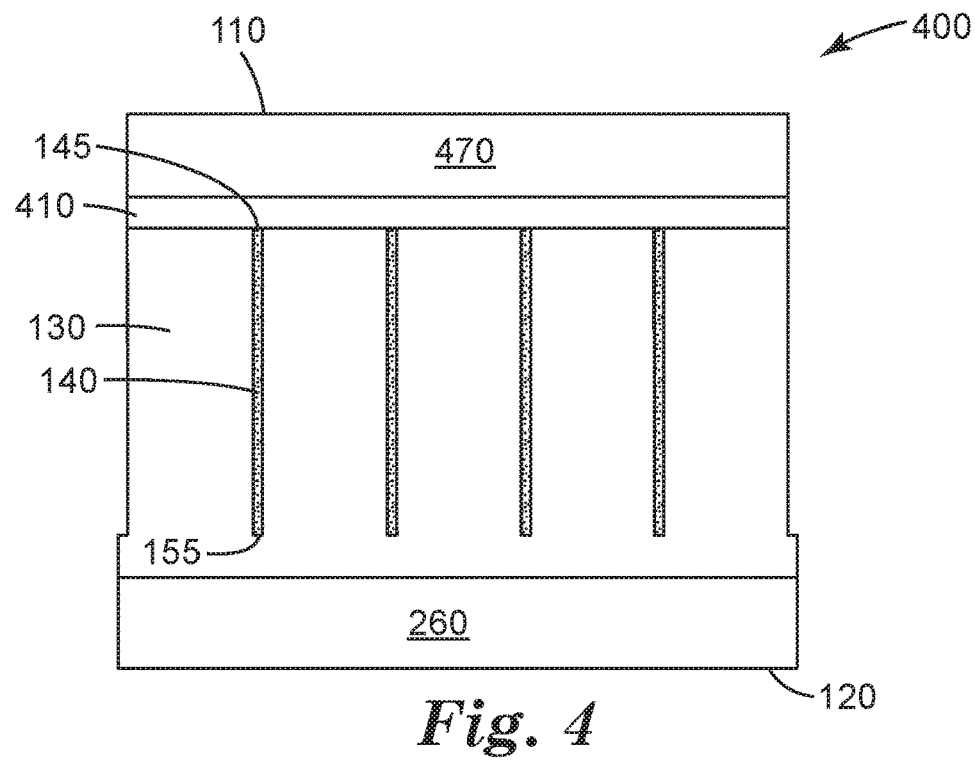
FIG. 4 is a perspective view of a light control film further comprising a cover film bonded with an adhesive layer.
Figure 6:
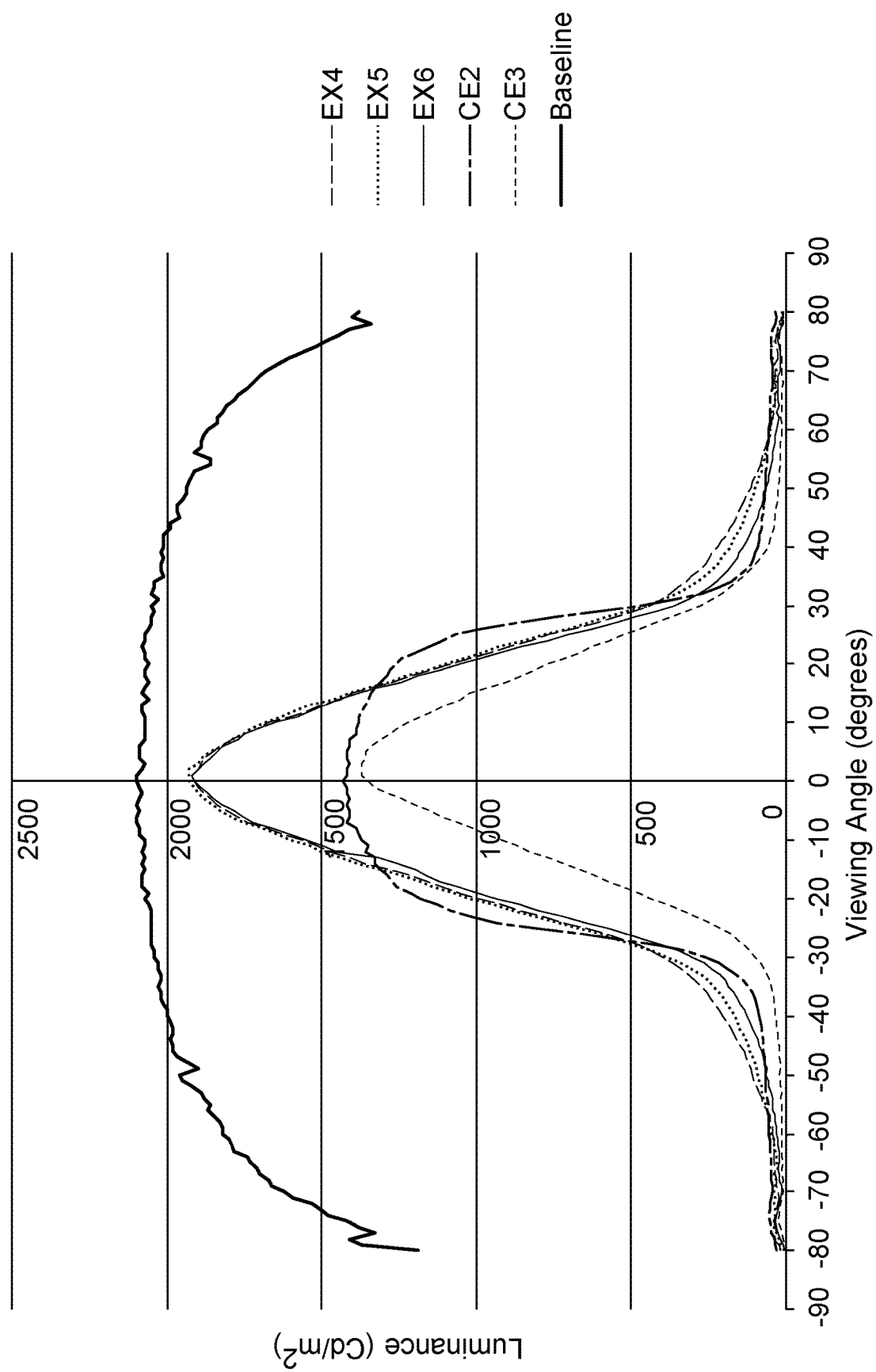
FIG. 6 is a plot of luminance versus viewing angle for various light control films.

Luminance can be measured according to the test method described in the examples. The luminance can be measured on the alternating transmissive and absorptive regions, such as illustrated in FIG. 1a or the total light control film that may further comprise a cover film, such as illustrated in FIG. 4. Relative transmission (e.g. brightness of visible light) is defined as the percentage of luminance, at a specified viewing angle or range of viewing angles, between a reading with the light control film including the alternating transmissive and absorptive regions and optionally other layers and a reading without the light control film (i.e. the baseline). With reference to FIG. 6, the viewing angle can range from −90 degrees to +90 degrees. A viewing angle of 0 degrees is orthogonal to light input surface 110; whereas viewing angles of −90 degrees and +90 degrees are parallel to light input surface 110.

For example, with reference to FIG. 6, the on-axis baseline luminance is 2100 Cd/m². EX. 6 has an on-axis luminance of 1910 Cd/m². Thus, the relative transmission (e.g. brightness) is 1910 Cd/m²/2100 Cd/m² multiplied by 100, which equals 91.0%. Unless specified otherwise, the relative transmission refers to the relative transmission of visible light having a 400-700 nm wavelength range as measured by the conoscope test method described in further detail in the examples.

The alternating transmissive and absorptive regions or total LCF can exhibit increased relative transmission (e.g. brightness) at a viewing angle of 0 degrees. In some embodiments, the relative transmission (e.g. brightness) is at least 75, 80, 85, or 90%. The relative transmission (e.g. brightness) is typically less than 100%.

The alternating transmissive and absorptive regions or total LCF can exhibit high transmission of other wavelengths of light at a viewing angle of 0 degrees. The transmission of near infrared (NIR) light having a wavelength range of 700-1400 nm and ultraviolet (UV) light having a wavelength range of 320-400 nm refers to transmission as measured by the spectrophotometry method described in further detail in the examples.

In some embodiments, the alternating transmissive and absorptive regions or total LCF has a transmission for a wavelength of the range 700-1400 nm (NIR) at a viewing angle of 0 degrees of at least 50, 55, 60, 65, 70, 75, or 80%. In some embodiments, the alternating transmissive and absorptive regions or total LCF has a transmission for a wavelength of the range 320-400 nm (UV) at a viewing angle of 0 degrees of at least 50% or 60%. The transmission can be for a single wavelength of the wavelength range or the transmission can be an average transmission for the entire wavelength range.

Alternatively, the alternating transmissive and absorptive regions or total LCF can exhibit low transmission of other wavelengths of light at a viewing angle of 0 degrees. The (e.g. PET) base film and material of the light transmissive regions and land layer can have high transmission of visible and NIR light, yet lower transmission of UV light. Further, inclusion of a (e.g. color shifting) film can substantially reduce the transmission of both UV and NIR light, while exhibiting high transmission of visible light. In some embodiments, the alternating transmissive and absorptive regions or total LCF have a transmission for a wavelength of 700-1400 nm (NIR) at a viewing angle of 0 degrees of less than 50, 45, 40, or 30%. In some embodiments, the alternating transmissive and absorptive regions or total LCF have a transmission for a wavelength of the range 320-400 nm (UV) at a viewing angle of 0 degrees of less than 50, 45, 40, 35, 30, 25, 20, 15, 10 or 5%. The transmission can be for a single wavelength of the wavelength range or the transmission can be an average transmission for the entire wavelength range.

In typical embodiments, the LCF has significantly lower transmission at other viewing angles. For example, in some embodiments, the relative transmission (e.g. brightness of visible light) at a viewing angle of −30 degrees, +30 degrees, or an average of −30 degrees and +30 degrees is less than 50, 45, 40, 35, 30, or 25%. In other embodiments, the relative transmission (e.g. brightness) at a viewing angle of 30 degrees, +30 degrees, or the average of −30 degrees and +30 degrees is less than 25, 20, 15, 10 or 5%. In some embodiments, the relative transmission (e.g. brightness) at a viewing angle of +/−35, +/−40, +/−45, +1-50, +/−55, +/−60, +/−65, +/−70, +/−75, or +/−80 degrees is less than 25, 20, 15, 10 or 5%, or less than 5%. In some embodiments, the average relative transmission (e.g. brightness) for viewing angles ranging from +35 to +80 degrees, −35 to −80 degrees, or the average of these ranges is less than 10, 9, 8, 7, 6, 5, 4, 3, or 2%. The alternating transmissive and absorptive regions or total LCF can exhibit significantly lower transmission of NIR or UV wavelengths of light at other viewing angles. For example, in some embodiments, the alternating transmissive and absorptive regions or total light control film has a transmission for a wavelength range of the range 700-1400 nm (NIR) at a viewing angle of 30 degrees of less than 50, 45, 40, 35, 30, 25, 20, 15, 10 or 5%. In some embodiments, the alternating transmissive and absorptive regions or total light control film has a transmission at a wavelength range of the range 320-400 nm (UV) at a viewing angle of 30 degrees of less than 50, 45, 40, 35, 30, 25, 20, 15, 10, 5, 4, 3, 2, or 1%. In some embodiments, the transmission of NIR or UV wavelengths of light at viewing angles of 60 degrees also fall within the previously stated range and is typically lower than the transmission at 30 degrees. In some embodiments, the alternating transmissive and absorptive regions or total light control film has an average transmission for a wavelength range of the range 700-1400 nm (NIR) at a viewing angle of 60 degrees of less than 5, 4, 3, 2, or 1%.

Thus, the light control films described herein can exhibit various combinations of high and low transmission properties at various viewing angles for various wavelengths of light (visible, UV, and NIR).

In one embodiment, the light control film exhibits high transmission of NIR at various viewing angles (e.g. 0, 30, and 60 degrees), yet lower transmission of visible and UV, as previously described. The light control film can exhibit a transmission for a wavelength of the range 700-1400 nm (NIR) of at least 60, 65, 70, 75, or 80% and a transmission for a wavelength of the range 700-1400 nm (NIR) at a viewing angle of 30 and/or 60 degrees of at least 10, 15, 20, 25, 30, 35, 40, 45, or 50%.

LCFs with significantly lower transmission at "off-axis" viewing angles are suitable for use as privacy films. Such films allow a viewer directly in front of a display (viewing angle of 0 degrees) to see the image yet blocks viewers at "off-axis" angles from seeing such image. The absorptive regions can be characterized with respect to the maximum surface area of absorptive regions that blocks (e.g. absorbs) light at the light input surface or light output surface. The light input or output surface of a light control film can be viewed with an optical microscope (e.g. at 200× magnification). For smaller absorptive regions (e.g. $W_A$ less than 1 micron, a higher resolution microscope, (e.g. scanning electron microscope) can be used to measure the surface area. The maximum width of multiple absorptive regions (i.e., $W_A$ in FIG. 1a) and pitches (i.e., $P_A$ in FIG. 1a) can be measured by analyzing the optical microscope images with ImageJ software (such as available from the National Institute of Health at http://imagej.nih.gov/ij).

Figure 1C:
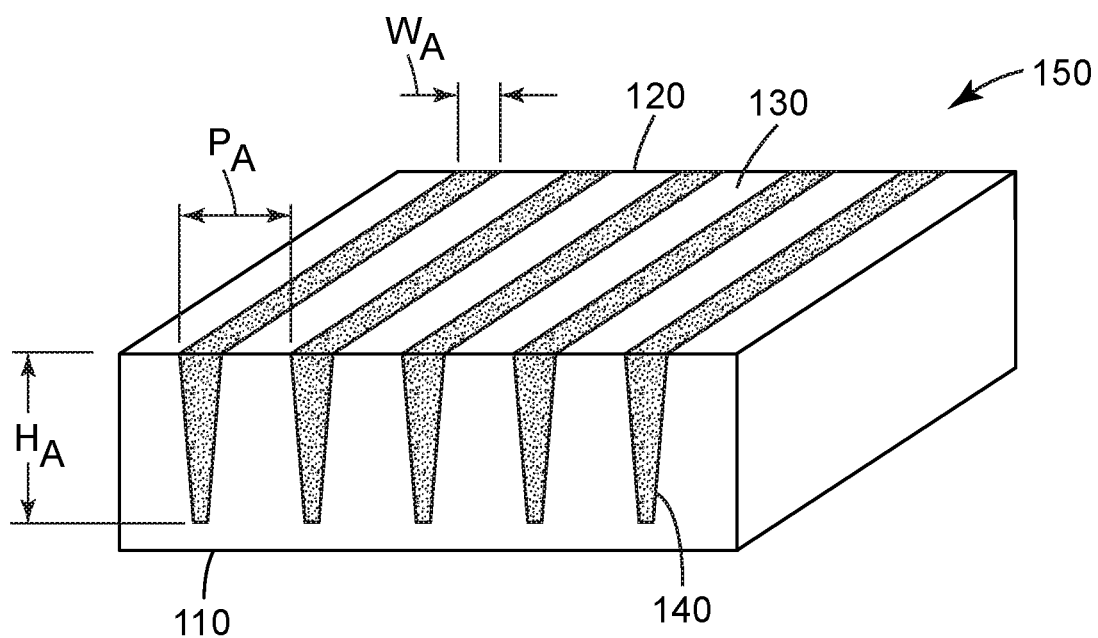
FIG. 1c is a perspective view of a comparative microstructured film.

FIG. 1c is a perspective view of a comparative LCF 150 that comprises a light output surface 120 and an opposing light input surface 110. The light output surface 120 is typically parallel to the light input surface 110. LCF 700 includes alternating transmissive regions 130 and absorptive regions 140 disposed between the light output surface 120 and a light input surface 110. For comparative light control films (CE2), as illustrated in FIG. 1c, the average maximum width of (e.g. five) absorptive regions, $W_A$ is 15 microns. The average pitch, $P_A$, (distance between absorptive regions) is 65 microns. The ratio $W_A/P_A$ equals 0.23, or 23%. In other words, the maximum surface area the absorptive regions occupy is 23% of the total alternating transmissive and absorptive regions of the light output surface 720.

The absorptive regions presently described block (e.g. absorbs) less light than the comparative light control film. In typical embodiments, the maximum surface area the absorptive regions occupy is less than 20, 19, 18, 17, 16, 15, 14, 13, 12, 11, 10, 9, 8, 7, 6, 5, 4, or 3% of the total alternating transmissive and absorptive regions. When the absorptive regions have a wall angle of zero or in other words the height is orthogonal to the light input and output surface as depicted in FIG. 1a, the maximum surface area the absorptive regions occupy can be calculated in the same manner as the comparative light control film as just described (i.e. ratio $W_A/P_A$). When the absorptive regions have a wall angle of greater than zero, the ratio of $W_A/P_A$ does not account for all the light that is blocked as light passes through the film in a direction orthogonal to the light input and light output surfaces. In this embodiment, "d" can be calculated from the wall angle and line 160 that is perpendicular to light output surface 120. This total surface area of light that is blocked is equal to $(d+W_A)/(W_T+W_A)$. For example, when $W_T$ is 30 microns, $W_A$ is 0.5 microns, and the wall angle is 3 degrees, then $(d+W_A)/(W_T+W_A)=)(\tan(3°\ H_A+0.5)/(30+0.5)$ and the total surface area of light blocked is 17.1%.

Figure 2:
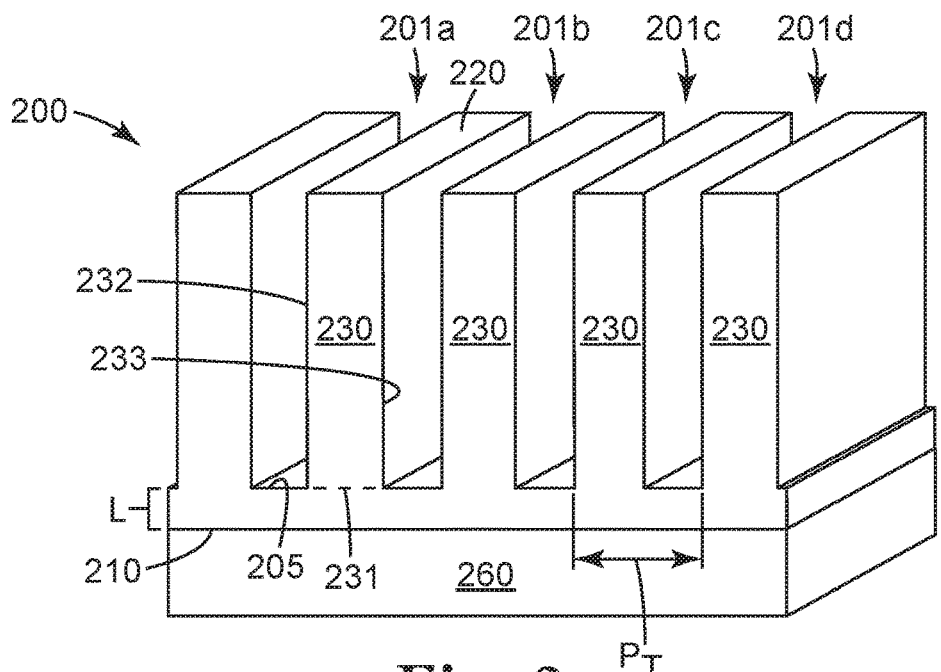
FIG. 2 is a perspective view of a microstructured film.

The absorptive regions can be formed by coating the surface of a microstructured film. FIG. 2 shows an embodied microstructured film article 200 that can be coated to make an LCF. The depicted microstructured film includes a microstructured surface 210 comprising a plurality of channels 201a-201d on base layer 260. As shown in FIG. 2, a continuous land layer "L" can be present between the bottom of the channels 205 and the top surface 210 of base layer 260.

Alternatively, the channels 201 can extend all the way through the microstructured film article 200. In this embodiment (not shown), the bottom surface 205 of the groove can be coincident with the top surface 210 of a base layer 260. In typical embodiments, the base layer 260 is a preformed film that comprises a different organic polymeric material than the transmissive regions 230 as will subsequently be described.

The height and width of protrusions (e.g. transmissive regions) 230 are defined by adjacent channels (e.g. 201a and 201b). The protrusions (e.g. transmissive regions) 230 can be defined by a top surface 220, a bottom surface, 231, and side walls 232 and 233 that join the top surface to the bottom surface. The side walls can be parallel to each other. More typically the side walls have a wall angle as previously described.

In some embodiments, the protrusions (e.g. transmissive regions) 230 have a pitch, "$P_T$" of at least 10 microns. The pitch is the distance between the onset of a first protrusion (e.g. transmissive region) and the onset of a second protrusion (e.g. transmissive region) as depicted in FIG. 2. The pitch may be at least 15, 20, 25, 30, 35, 40, 45, or 50 microns. The pitch is generally no greater than 1 mm. The pitch is typically no greater than 900, 800, 700, 600, or 500 microns.

In some embodiments, the pitch is typically no greater than 550, 500, 450, 400, 350, 300, 250 or 200 microns. In some embodiments, the pitch is no greater than 175, 150, 100 microns. In typical embodiments, the protrusions are evenly spaced, having a single pitch. Alternatively, the protrusions may be spaced such that the pitch between adjacent protrusions is not the same. In this later embodiment, at least some and typically the majority (at least 50, 60, 70, 80, 90% or greater of the total protrusions) have the pitch just described.

The pitch of the absorptive regions $P_A$ is within the same range as just described for the light transmissive regions.

The pitch and height of the protrusions (e.g. transmissive regions) can be important to facilitate coating of the protrusions (e.g. transmissive regions) with a light absorbing coating. When the protrusions are spaced too close together it can be difficult to uniformly coat the side walls. When the protrusions are spaced too far apart, the light absorbing coating may not be effective at providing its intended function, such as privacy at off-axis viewing angles.

The absorptive regions are formed by providing a light absorptive coating on the side walls of protrusions (e.g. transmissive regions) of a microstructured film. The thickness of the light absorptive coating is equivalent to the width of the absorptive regions, $W_A$, as previously described. The absorptive regions can be formed by any method that provides a sufficiently thin, conformal, light absorptive coating on the side walls (e.g. 232, 233).

In one embodiment, the absorptive regions are formed by a combination of additive and subtractive methods.

Figure 3:
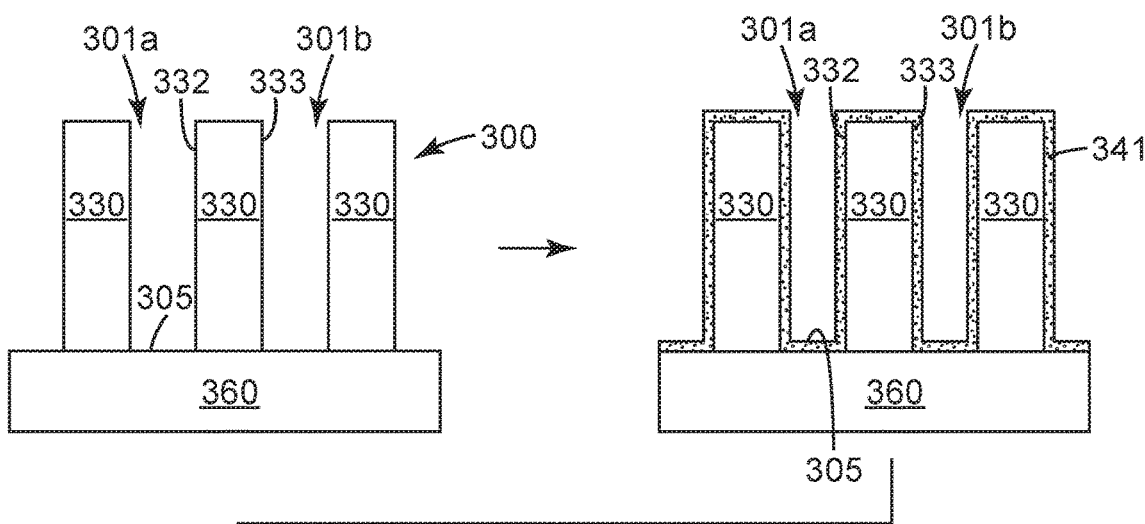
FIG. 3 is a cross-sectional schematic of an embodied method of making a light control film.
Figure 3:
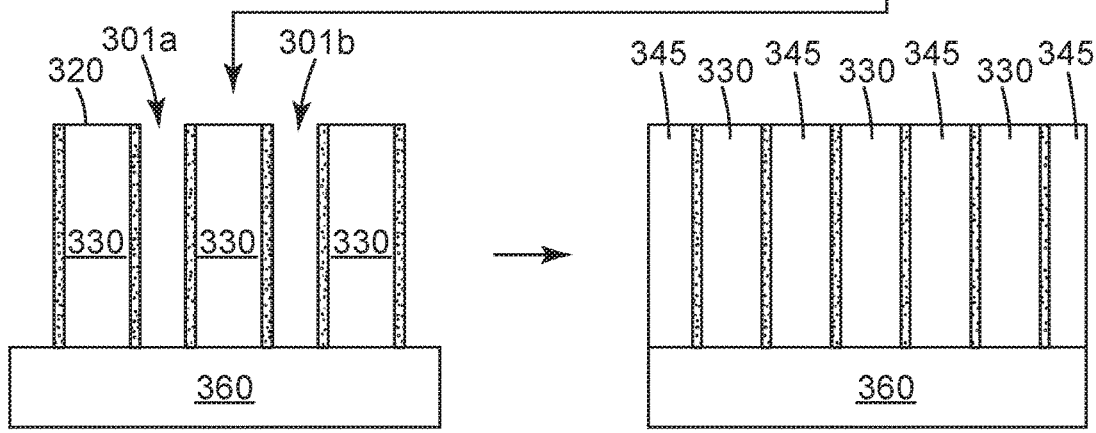

With reference to FIG. 3, the light control film can be prepared by providing a microstructured film 300 (such as the microstructured film of FIG. 2) comprising a plurality of protrusions (e.g. transmissive regions) defined by a top surface (e.g. 320) and side walls (332, 333). The plurality of protrusions (e.g. transmissive regions) 330 are separated from each other by channels 301a and 301b. The side walls of the protrusions (e.g. transmissive regions) are coincident with the side walls of the channels. The channels further comprise a bottom surface 305 that is parallel to or coincident with top surface of base layer 360. The method further comprises applying a light absorptive coating 341 to the (e.g. entire) surface of the microstructured film, i.e. the top surface 320 and side walls 332, 333 of the protrusions (e.g. transmissive regions) and the bottom surface 305 of the channels that separate the protrusions (e.g. transmissive regions). The method further comprises removing the coating from the top surface 320 of the protrusions (e.g. transmissive regions) and bottom surface 305 of the channels. In some embodiments, the method further comprises filling the channels with an organic polymeric material 345 such as (e.g. the same) polymerizable resin as the protrusions (e.g. transmissive regions) and curing the polymerizable resin. When the channels are not filled with a cured polymerizable resin, the channels are typically filled with air.

A microstructure-bearing article (e.g. microstructured film article 200 shown in FIG. 2) can be prepared by any suitable method. In one embodiment, the microstructure-bearing article (e.g. microstructured film article 200 shown in FIG. 2) can be prepared by a cast and cure method, as described in U.S. Pat. No. 8,096,667, including the steps of (a) preparing a polymerizable composition;

(b) depositing the polymerizable composition onto a master negative microstructured molding surface (e.g. tool) in an amount barely sufficient to fill the cavities of the master; (c) filling the cavities by moving a bead of the polymerizable composition between a (e.g. preformed film) base layer and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions and has a surface energy that allows clean removal of the polymerized material from the master. When the base layer is a preformed film, one or more of the surfaces of the film can optionally be primed or otherwise be treated to promote adhesion with the organic material of the light transmissive regions. In one embodiment, the base layer comprises a thermoset acrylic polymer as a primer such as available from Dow Chemical, Midland, MI under the trade designation "Rhoplex 3208".

The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can comprise a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof.

The polymerizable resin can be a radiation curable polymeric resin, such as a UV curable resin. In some cases, polymerizable resin compositions useful for the LCF of the present invention can include polymerizable resin compositions such as are described in U.S. Pat. No. 8,012,567 (Gaides et al.), to the extent that those compositions satisfy the index and absorption characteristics herein described.

The chemical composition and thickness of the base layer can depend on the end use of the LCF. In typical embodiments, the thickness of the base layer can be at least about 0.025 millimeters (mm) and can be from about 0.05 mm to about 0.25 mm.

Useful base layer materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base layer can contain mixtures or combinations of these materials. In some embodiments, the base layer may be multi-layered or may contain a dispersed component suspended or dispersed in a continuous phase.

Examples of base layer material include polyethylene terephthalate (PET) and polycarbonate (PC). Examples of useful PET films include photograde polyethylene terephthalate, available from DuPont Films of Wilmington, Del. under the trade designation "Melinex 618". Examples of optical grade polycarbonate films include LEXAN™ polycarbonate film 8010, available from GE Polymershapes, Seattle Wash., and Panlite 1151, available from Teijin Kasei, Alpharetta Ga. In some embodiments, the base layer is a PET film having a thickness of 75 microns. The base layer can have a matte or glossy finish.

Some base layers can be optically active and can act as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microtine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. No. 5,825,543 (Ouderkirk et al.); U.S. Pat. No. 5,783,120 (Ouderkirk et al.); U.S. Pat. No. 5,882,774 (Jonza et al.); U.S. Pat. No. 5,612,820 (Shrenk et al.) and U.S. Pat. No. 5,486,949 (Shrenk et al.). The use of these polarizer films in combination with prismatic brightness enhancement film has been described, for example, in U.S. Pat. No. 6,111,696 (Allen et al.) and U.S. Pat. No. 5,828,488 (Ouderkirk et al.). Films available commercially are multilayer reflective polarizer films such as 3M™ Dual Brightness Enhancement Film "DBEF", available from 3M Company.

In some embodiments, the base layer or cover film is a multilayer film that imparts a color shifting effect such as described in U.S. Pat. No. 8,503,122. Suitable color shifting films are described in U.S. Pat. No. 6,531,230 to Weber et al; incorporated herein by reference. Other suitable color shifting films include multilayer films generated by spin coating, blade coating, dip coating, evaporation, sputtering, chemical vapor deposition (CVD), and the like. Exemplary films include both organic and inorganic materials. Such films are described, for instance, in U.S. Pat. Nos. 7,140,741; 7,486,019; and 7,018,713.

The multilayer optical film can be an ultraviolet reflector, a blue reflector, a visible reflector, or an infrared reflector, as further described in U.S. Pat. No. 9,829,604, (Schmidt) dated Nov. 28, 2017, incorporated herein by reference.

In some embodiments, the multilayer optical film can be characterized as a UV reflective multilayer optical film (i.e. a UV reflector or UV mirror). A UV reflective multilayer optical film refers to a film having a reflectivity at normal incidence of at least 50, 60, 70, 80, or 90% for a bandwidth ranging from 290 nm to 400 nm. In some embodiments, the reflectivity at normal incidence for a bandwidth ranging from 290 nm to 400 nm is at least 91, 92, 93, 94, 95, 96, 97, or 98%. A UV reflective multilayer optical film can have low reflectivity and high transmission for visible light. For example, the transmission of visible light can be at least 85% or 90%.

In some embodiments, the multilayer optical film can be characterized as a UV-blue reflective multilayer optical film (i.e. a UV-blue reflector or UV-blue mirror). A UV-blue reflective multilayer optical film refers to a film having a reflectivity at normal incidence of at least 50, 60, 70, 80, or 90% for a bandwidth ranging from 350 nm to 490 nm. In some embodiments, the reflectivity at normal incidence for a bandwidth ranging from 350 nm to 490 nm is at least 91, 92, 93, 94, 95, 96, or 97%. The UV-blue reflective multilayer optical film can have low reflectivity and high transmission for visible light having wavelength greater than 500 nm. For example, the transmission of visible light having wavelength greater than 500 nm can be at least 85% or 90%.

In some embodiments, the multilayer optical film can be characterized as a near infrared reflective multilayer optical film (i.e. near infrared reflector or near infrared mirror). A near infrared reflective multilayer optical film refers to a film having a reflectivity at normal incidence of at least 50, 60, 70, 80, or 90% for a bandwidth ranging from 870 nm to 1100 nm. In some embodiments, the reflectivity at normal incidence for a bandwidth ranging from 870 nm to 1100 nm is at least 91, 92, 93, or 94%. In some embodiments, the film exhibits this same near infrared reflectivity at a 45 degree angle. The near infrared reflective multilayer optical film can have low reflectivity and high transmission for visible light. For example, the transmission of visible light can be at least 85%, 86%, 87% or 88%.

A visible light reflective multilayer optical film (e.g. visible reflector or visible mirror) refers to a film having a reflectivity at normal incidence of at least 50, 60, 70, 80, or 90% for a bandwidth ranging from 400 nm to 700 nm. In some embodiments, the reflectivity at normal incidence for a bandwidth ranging from 400 nm to 700 nm is at least 91, 92, 93, 94, 95, 96, 97, or 98%. The near infrared reflectivity properties of such broadband reflector are as previously described.

In other embodiments, a single multilayer optical film can reflect more than one bandwidth and may be considered a broadband reflector. For example, the multilayer optical film may be a visible and near infrared reflective multilayer optical film. Thus, such multilayer optical film has high reflectivity of both visible and near infrared bandwidths.

Additionally, two or more multilayer optical film mirrors, e.g. with different reflection bands, laminated together to broaden the reflection band. For example, a multilayer optical film visible reflector, such as previously described, can be combined with a UV, a UV-blue, and/or near infrared reflector. Various other combinations can be made as appreciated by one of ordinary skill in the art.

Alternatively, the microstructure-bearing article (e.g. microstructured film article 200 shown in FIG. 2) can be prepared by melt extrusion, i.e. casting a fluid resin composition onto a master negative microstructured molding surface (e.g. tool) and allowing the composition to harden. In this embodiment, the protrusions (e.g. light transmissive regions) are interconnected in a continuous layer to base layer 260. The individual protrusions (e.g. light transmissive regions) and connections therebetween generally comprises the same thermoplastic material. The thickness of the land layer (i.e. the thickness excluding that portion resulting from the replicated microstructure) is typically between 0.001 and 0.100 inches and preferably between 0.003 and 0.010 inches.

The thickness of the land layer can be lower when the microstructure-bearing article (e.g. microstructured film article 200 shown in FIG. 2) is prepared from the previously described cast and cure process. For example, the thickness of the land layer is typically at least 0.5, 1, 2, 3, 4, or 5 microns ranging up to 50 microns. In some embodiments, the thickness of the land layer is no greater than 45, 40, 35, 30, 25, 20, 15, or 10 microns. In one embodiment, the land layer is 8 microns.

Suitable resin compositions for melt extrusion are transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers and copolymers, such as those marketed under the brand name of SURLYN by E. I. Dupont de Nemours and Co., Inc.; (poly)ethylene-co-acrylic acid; polyesters; polyurethanes; fluoropolymers; silicone polymers; ethylene vinyl acetate (EVA) copolymers, and cellulose acetate butyrates. Polycarbonates are particularly suitable because of their toughness and relatively higher refractive index.

In yet another embodiment, the master negative microstructured molding surface (e.g. tool) can be employed as an embossing tool, such as described in U.S. Pat. No. 4,601,861 (Pricone).

The absorptive regions are generally formed by coating the surface of a microstructured film. Various coating methods can be used including for example layer-by-layer coating (LbL) as well as coating techniques such as wire-wound rod, (e.g. direct, kiss, reverse) gravure, 3 roll and 5 roll coating, air-knife, spray coating, notch-bar coating, knife coating, slot die coating, immersion dip coating, curtain coating and trailing blade coating.

Light absorbing materials useful for forming light absorbing regions can be any suitable material that functions to absorb or block light at least in a portion of the visible spectrum. In typical embodiments, the light absorbing materials also absorb or block at least a portion of the UV and/or IR spectrum. Preferably, the light absorbing material can be coated or otherwise provided on the side walls of the light transmissive regions to form light absorbing regions in the LCF. Exemplary light absorbing materials include a black or other light absorbing colorant (such as carbon black or another pigment or dye, or combinations thereof). Other light absorbing materials can include particles or other scattering elements that can function to block light from being transmitted through the light absorbing regions.

When the light absorbing material (e.g. coating) includes particles, the particles have a median particle size D50 equal to or less than the thickness of the light absorbing material (e.g. coating) or in other words substantially less than the width of the absorptive regions $W_A$.

The median particle size is generally less than 1 micron. In some embodiments, the median particle size is no greater than 900, 800, 700, 600, or 500 nm. In some embodiments, the median particle size is no greater than 450, 400, 350, 300, 250, 200, or 100 nm. In some embodiments, the median particle size is no greater than 90, 85, 80, 75, 70, 65, 60, 55, or 50 nm. In some embodiments, the median particle size is no greater than 30, 25, 20, or 15 nm. The median particle size is typically at least 1, 2, 3, 4, or 5 nanometers. The particle size of the nanoparticles of the absorptive regions can be measured using transmission electron microscopy or scanning electron microscopy, for example.

"Primary particle size" refers to the median diameter of a single (non-aggregate, non-agglomerate) particle. When the light absorbing or light reflective particles are present as unagglomerated and unaggregated particles, the median particle size refers to the median primary particle size. "Agglomerate" refers to a weak association between primary particles which may be held together by charge or polarity and can be broken down into smaller entities. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. When the light absorbing or light reflective particles are present as aggregates, the median particle size refers to the median particle size of the aggregate. In some embodiments, a majority of the nanoparticles (i.e. at least 50%) are present as discrete unagglomerated nanoparticles. For example, at least 70%, 80% or 90% of the nanoparticles (e.g. of the coating solution) are present as discrete unagglomerated nanoparticles.

The concentration of light absorbing nanoparticles is typically at least 10, 15, 20, 25, 30, 35, 40, 45, or 50 wt.-% of the total light absorptive region. In some embodiments, the concentration of light absorbing nanoparticles is at least 55, 60, 65, 70, or 75 wt.-% of the total light absorptive regions. The concentration of light absorbing nanoparticles can be determined by methods known in the art, such as thermogravimetric analysis.

In one embodiment, the method comprises applying a layer-by layer light absorptive coating to the surface of the microstructured film, i.e. the top surface and side walls of the protrusions and bottom surface of the channels.

In some embodiments, the plurality of layers disposed on the surface of the microstructured film comprise at least two layers deposited by what is commonly referred to as a "layer-by-layer self-assembly process". This process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. "Polyelectrolyte" means a polymer or compound with multiple ionic groups capable of electrostatic interaction. "Strong polyelectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids). Typically, this deposition process involves exposing the substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. polyelectrolyte bath) liquid solution, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time is typically on the order of minutes. The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. polyelectrolyte or inorganic oxide nanoparticle bath) liquid solution, which has charge opposite that of the first polyion (e.g. bath) liquid solution. Once again adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

Some examples of suitable processes include those described in Krogman et al., U.S. Pat. No. 8,234,998; Hammond-Cunningham et al., US2011/0064936; and Nogueira et al., U.S. Pat. No. 8,313,798. Layer-by layer dip coating can be conducted using a StratoSequence VI (nanoStrata Inc., Tallahassee, FL) dip coating robot.

In one embodiment, the plurality of bi-layers deposited by layer-by-layer self-assembly is a polyelectrolyte stack comprising an organic polymeric polyion (e.g. cation) and counterion (e.g. anion) comprising a light absorbing material (e.g. pigment). At least a portion of the cation layers, anion layers, or a combination thereof comprise a light absorbing material (e.g. pigment) ionically bonded to the polyelectrolyte.

The thickness of a bi-layer and the number of bi-layers are selected to achieve the desired light absorption. In some embodiments, the thickness of a bi-layer, the number of bi-layers are selected to achieve the desired (e.g. absorption) optical properties using the minimum total thickness of self-assembled layers and/or the minimum number of layer-by-layer deposition steps. The thickness of each bi-layer typically ranges from about 5 nm to 350 nm. The number of bi-layers is typically at least 5, 6, 7, 8, 9, or 10. In some embodiments, the number of bilayers per stack is no greater than 150 or 100. The thickness of a stack is equivalent to the width of the absorptive regions $W_A$, as previously described.

A light absorbing compound is dispersed within at least a portion of the polyelectrolyte layers. Various polyelectrolytes can be utilized including inorganic compounds, such as silica or silicate, as well as various phosphonocarboxylic acids and salts thereof (some of which are described in WO2015/095317; incorporated herein by reference.)

Polyelectrolyte organic polymers can be preferred since such materials can be more easily removed by reactive ion etching than inorganic materials. In some embodiments, at least one of the polyelectrolytes of the absorptive regions is an organic polymer.

Suitable polycationic organic polymers include, but are not limited to linear and branched poly(ethylenimine) (PEI), poly(allylamine hydrochloride), polyvinylamine, chitosan, polyaniline, polyamidoamine, poly(vinylbenzyltriamethylamine), polydiallyldimethylammonium chloride (PDAC), poly(dimethylaminoethyl methacrylate), poly(methacryloylamino)propyl-trimethylammonium chloride, and combinations thereof including copolymers thereof.

Suitable polyanionic organic polymers include, but are not limited to, poly(vinyl sulfate), poly(vinyl sulfonate), poly(acrylic acid) (PAA), poly(methacrylic acid), poly(styrene sulfonate), dextran sulfate, heparin, hyaluronic acid, carrageenan, carboxymethylcellulose, alginate, sulfonated tetrafluoroethylene based fluoropolymers such as Nafion®, poly(vinylphosphoric acid), poly(vinylphosphonic acid), and combinations thereof including copolymers thereof.

The polyelectrolyte organic polymers just described can be characterized are polymers with (e.g. repeating) polymerized units that bear an ionic or ionizable group. These groups dissociate in aqueous solutions (water), rendering the polymers charged.

Other types of polymers with multiple ionic groups capable of electrostatic interaction are aqueous dispersions of organic polymers. In some embodiments, these polymers also contain polymerized units that bear an ionic or ionizable group. However, the concentration of such groups is significantly lower such that the organic polymers can be dispersed in an aqueous solution, yet do not dissolve forming a solution. Thus, such organic polymers can be characterized as water insoluble. In other embodiments, organic polymers may be rendered water dispersible by use of ionic surfactants.

Water-soluble polyelectrolytes are typically insoluble in organic solvents, such as tetrahydrofuran (THF). In contrast, organic polymers (e.g. polyurethane and acrylic polymer) of aqueous dispersions are often soluble in organic solvents such as THF. By soluble it is meant that at least 50% of the coating (or at least 50% of the organic polymer portion of the coating when the coating has greater than 50 wt. % of light absorbing or light reflecting particles) is removed from the coated substrate (e.g. glass) after soaking in a jar containing organic solvent (e.g. THF) after 30 minutes in a bath sonicator (Branson Model 3510).

Favored organic polymer dispersions include polyurethane polymer dispersions, acrylic polymer dispersions, polyester dispersions, polyolefin dispersion, polyethylene and polypropylene dispersions and their copolymer dispersions including ethylene-vinyl acetate copolymer dispersions, epoxy dispersions, phenolic dispersions, polyimide and polyamide dispersions, vinyl chloride dispersions and mixture thereof. Such polymers are typically thermoplastic.

In some embodiments, the polyurethane dispersion comprises a polyester backbone, a polycarbonate backbone, a polyester carbonate or a combination thereof. In other embodiments, the acrylic dispersion comprises an acrylic backbone, a hydroxyl-containing acrylic backbone, or a combination thereof. In yet other embodiments, the polymeric dispersion is a urethane-acrylic hybrid. A mixture of organic polymer dispersions may be employed such as a mixture of a polyurethane and an acrylic polymer.

Various processes have been developed for the preparation of waterborne or aqueous polymeric dispersions. In the preparation of aqueous polyurethane polymers, typically a medium molecular weight polymer (e.g. prepolymer) is formed by the reaction of suitable diols or polyols with a molar excess of diisocyantes or polyisocyanates in the presence of an internal emulsifier. The internal emulsifier is typically a diol with an ionic group (carboxylate, sulfonate, or quaternary ammonium slat) or a non-ionic group, such as poly(ethylene oxide). Aqueous polyurethane dispersions are typically one of three types, i.e. non-ionic, cationic or anionic depending on the type of hydrophilic groups or segments present in the polyurethane backbone. When the coating is applied layer-by-layer via electrostatic interactions, the organic polymer of the dispersion comprises ionic moieties and thus, is cationic or anionic. However, when other coating methods are used, non-ionic polymeric dispersions can be utilized.

In the case of anionic polyurethanes, dimethyol propionic acid (DMPA) is commonly incorporated into the polyurethane backbone due to its effectiveness for water dispersions in the subsequent neutralization reactions with triethylamine. The carboxylate ion of DMPA in the polymer is hydrophilic and serves an anionic center as well an internal emulsifier. Carboxylic ions not only stabilize aqueous polyurethane dispersions, but also provide curing sites.

Aqueous acrylic polymers are also typically prepared with an internal emulsifier (e.g. acrylic acid units) and thus typically also comprise carboxylate ions to stabilize the dispersion and provide curing sites.

Alternatively, cationic polymeric dispersions may have quaternary ammonium groups or tertiary amine groups.

Examples of commercially available aliphatic acrylic dispersions include cationic acrylic latexes available as the tradenames Raycat® 65124 and Picassian® AC-181.

In some embodiments, the organic polymer of the coating is a thermoplastic aliphatic polyurethane. Thermoplastic polyurethane compositions are generally the reaction product of a diisocyanate with short-chain diols (also referred to as chain extenders) and of diisocyantes with long-chained difunctional diols (known as polyols). Polyurethanes are characterized as having urethane groups, i.e. —NH—(C=O)—O— that link the segments derived from the diisocyanate and diol. Such a urethane group comprise a carbonyl group —C=O.

Non-limiting examples of long-chained polyols are polyether polyols, polyester polyols, acrylic polyols and mixtures of such polyols. Typically, polyester based thermoplastic urethanes are known for providing good abrasion and chemical resistance. The final resin consists of linear polymeric chains in block-structures. Such chains contain low polarity segments, referred to as "soft segments", alternating with shorter, high polarity segments, referred to as "hard segments". Both types of segments are linked together by covalent links, forming random copolymers or block-copolymers.

The term "aliphatic polyurethane" means a polyurethane derived from at least one aliphatic polyisocyanate and at least one aliphatic isocyanate-reactive component, such as an aliphatic diol. Aliphatic polyisocyanates known to the art are: 1,4 cyclohexane bis(methyleneisocyanate); methylcyclohexylene diisocyanate; 1,4-cyclohexanyl diisocyanate; bis(1,4-isocyanato cyclohexyl) methane; 1,6-diisocyanato-2,2,4,4-tetramethylhexane; 1,6-diisocyanato-2,4,4-trimethylhexane; isophorone diisocyanate; and the like. The polyols used for aliphatic polyurethanes may be short chain diols such as neopentyl glycol, 1,6-hexane diol, and the like; as well as polyester or polyether polyols.

Examples of commercially available aqueous polyurethane dispersion include aliphatic polyether cationic urethane polymer dispersions available as the tradenames Sancure® 20051 (also known as PrintRite® DP675); Sancure® 20072 (also known as PrintRite® DP676); and Witcobond® UCX-214.

The organic polymers of the dispersions are typically thermoplastic and characterized as film-forming polymers. Prior to coalescence, the organic polymers are typically present as discrete particles. The organic polymer particles of the dispersion can coalesce at room temperature (25° C.) or higher temperatures depending on Tg or minimum film forming temperature (MFFT) of the organic polymer. When the organic particles of the dispersion coalesce, the electrically conducting (e.g. light absorbing or light reflecting) particles are spaced apart by a distance corresponding to the particle size of the organic polymer.

By spacing the electrically conducting (e.g. light absorbing or light reflecting) particles apart by the organic polymer particles of the dispersion or coalesced particles, the sheet resistance of the coating (e.g. absorption regions) or coated substrate (e.g. light control film) can be increased. In some embodiments, the coating or coated substrate (e.g. glass or light control film) has a sheet resistance of greater than $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ ohms/square. In some embodiments, the coating exhibits such sheet resistance at a dried coating thickness of about 500 nm. When the sheet resistance is sufficiently high and the light control film is applied to a touch screen of an electronic device, the touch responsiveness of the touch screen is the same as without the light control film. However, when the sheet resistance is too low, the presence of the light control film on the touch screen can reduce the responsiveness of touch screen.

The particle form as well as the spacing between electrically conducting (e.g. light absorbing or light reflecting) particles can be determined by transmission or scanning electron microscopy.

Typical organic polymer particle sizes of the dispersion range from about 0.01 micrometers (10 nm) to 5 microns. The polymer particle size is typically less than the thickness of the coating. Thus, the d90 particle size is typically less than 4.5, 4, 3.5, 3, 2.5, 2, 1.5, 1, or 0.5 microns. In some embodiments, the median d10 particle size is at least 20, 30, 40, 50, 60, 70, 80, or 90 nm. In some embodiments, the d50 or d90 particle size of the organic polymer is no greater than 400, 350 or 300 nanometers. In some embodiments, the organic polymer has a d50 median particle size less than 200, 175, 150, 125, 100, 75, or 50 nm. In some embodiments, the organic polymer has a d10 median particle size of less than 150, 125, 100, 75, or 50 nm. The median particle size of the organic polymer in an aqueous dispersion can be determined by Dynamic Light Scattering according to the test method described in the examples.

The smaller particles often ionically bond at a faster rate than larger particles. Thus, in some embodiments, the larger particles may remain in water, rather than become incorporated in the (e.g. layer-by-layer) coating of the absorptive regions.

The organic polymer cationic dispersion typically has a zeta potential of at least +5 mV or +20 mV. The organic polymer anionic dispersion typically has a zeta potential of less than −5 mV or −20 mV. When the absolute magnitude of the zeta potential is too low, the dispersion may not be stable resulting in the organic polymer particles separating from the aqueous phase. The organic polymer cationic dispersion typically has a zeta potential less than +100, +90, +80, +70, +60 or +50 mV. The organic polymer anionic dispersion typically has a zeta potential at least −50, −60, −70, −80, −90 or −100 mV. When the absolute magnitude of the zeta potential is too high, the particles may not densely pack together.

The molecular weight of the (both water soluble and water dispersible) polyelectrolyte polymers can vary, ranging from about 1,000 g/mole to about 1,000,000 g/mole. In some embodiments, the weight average molecular weight (Mw) of the organic polymer (e.g. poly(acrylic acid) negatively charged anionic layer) ranges from 50,000 g/mole to 150,000 g/mole.

In some embodiments, the molecular weight (Mw) of the organic polymer (e.g. polydiallyldimethylammonium chloride positively charged cationic layer) ranges from 50,000 g/mole to 300,000 g/mole. In some embodiments, the molecular weight (Mw) of the organic polymer (e.g. poly (ethyleneimine positively charged cationic layer) ranges from 10,000 g/mole to 50,000 g/mole. The polydispersity can range from 2 to 10. In some embodiments, the polydispersity of the organic polymer is less than 9, 8, 7, 6, 5, 4, or 3.

At least one of the polyions (e.g. the polyanion or polycation) comprises a (e.g. electrically conducting) light absorbing material.

In order to be stable in water as a colloidal dispersion and impart ionic groups, the light absorbing (e.g. pigment) particles typically further comprise an ionic surface treatment. In some embodiments, the surface treatment compound is anionic, such as in the case of sulfonate or carboxylate. The light absorbing (e.g. pigment) particles also function as the polyion with ionic binding groups for the alternating polyelectrolyte layer.

Suitable pigments are available commercially as colloidally stable water dispersions from manufacturers such as Cabot, Clariant, DuPont, Dainippon and DeGussa. Particularly suitable pigments include those available from Cabot Corporation under the CAB-O-JET® name, for example 250C (cyan), 260M (magenta), 270Y (yellow) or 352K (black). The light absorbing (e.g. pigment) particles are typically surface treated to impart ionizable functionality. Examples of suitable ionizable functionality for light absorbing (e.g. pigment) particles include sulfonate functionality, carboxylate functionality as well as phosphate or bisphosphonate functionality. In some embodiments, surface treated light absorbing (e.g. pigment) particles having ionizable functionality are commercially available. For example, CAB-O-JET® pigments, commercially available from Cabot Corporation, sold under the trade names 250C (cyan), 260M (magenta), 270Y (yellow) and 200 (black), comprise sulfonate functionality. As yet another example, CAB-O-JET® pigments commercially available from Cabot Corporation, under the trade names 352K (black) and 300 (black), comprise carboxylate functionality.

When the light absorbing (e.g. pigment) particles are not pre-treated, the light absorbing (e.g. pigment) particles can be surface treated to impart ionizable functionality as known in the art.

Multiple light absorbing materials (e.g. pigments) may be utilized to achieve a specific hue or shade or color in the final product. When multiple light absorbing materials (e.g. pigments) are used, the materials are selected to ensure their compatibility and performance both with each other and with the optical product components.

In some embodiments, such as when the absorptive regions comprise electrically conductive carbonaceous particles, such as carbon black, the light control film generally provides low transmission (e.g. less than 10%) at a viewing angle of 30 degrees for wavelengths ranging from 300 nm to 2400 nm. When the absorptive regions are colored, the light control film can exhibit a higher average transmission. For examples the transmission can be 10 to 30% at a viewing angle of 30 degrees for wavelengths ranging from 300 nm to 2400 nm. However, specific wavelength ranges can exhibit a lower transmission at the wavelength range of the color of the absorptive regions. In some embodiments, the transmission is less than 15% at a viewing angle of 30 degrees for wavelengths ranging from 300 nm to 550 nm. In some embodiments, the transmission is less than 5, 4, 3, 2, or 1% at a viewing angle of 30 degrees for wavelengths ranging from 600 nm to 750 nm.

At least a portion and typically 50 wt. % or greater (including all) of the polyelectrolyte is prepared and applied to the microstructured surface as an aqueous dispersion. A portion of polyelectrolyte can be prepared and applied to the microstructured surface as an aqueous solution. The term "aqueous" means that the liquid of the coating contains at least 85 percent by weight of water. It may contain a higher amount of water such as, for example, at least 90, 95, or even at least 99 percent by weight of water or more. The aqueous liquid medium may comprise a mixture of water and one or more water-soluble organic cosolvent(s), in amounts such that the aqueous liquid medium forms a single phase. Examples of water-soluble organic cosolvents include methanol, ethanol, isopropanol, 2-methoxyethanol, 3-methoxypropanol, 1-methoxy-2-propanol, tetrahydrofuran, and ketone or ester solvents. The amount of organic cosolvent typically does not exceed 15 wt-% of the total liquids of the coating composition. The aqueous polyelectrolyte composition for use in layer-by-layer self-assembly typically comprises at least 0.01 wt-%, 0.05 wt-% or 0.1 wt-% of polyelectrolyte and typically no greater than 5 wt-%, 4 wt-%, 3 wt-%, 2 wt-% or 1 wt-%.

In some embodiments, the aqueous solutions or dispersions further comprise a "screening agent", an additive that promotes even and reproducible deposition by increasing ionic strength and reducing interparticle electrostatic repulsion. Suitable screening agents include any low molecular weight salts such as halide salts, sulfate salts, nitrate salts, phosphate salts, fluorophosphate salts, and the like. Examples of halide salts include chloride salts such as LiCl, NaCl, KCl, $CaCl_2$, $MgCl_2$, $NH_4Cl$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $SrSO_4$, $Al_2(SO_4)_3$, and $Fe_2(SO_4)_3$. Organic salts such as $(CH_3)_3CCl$, $(C_2H_5)_3CCl$, and the like are also suitable screening agents.

Suitable screening agent concentrations can vary with the ionic strength of the salt. In some embodiments, the aqueous solution or dispersion comprises (e.g. NaCl) screening agent at a concentration ranging from 0.01M to 0.1M. The absorptive regions may contain trace amounts of screening agent.

After applying and drying the light absorbing coating to the (e.g. entire) surface of the microstructured film, the light absorbing coating is then removed from the top portions of the transmissive (e.g. protrusions) regions and also removed from the land regions, between the transmissive (e.g. protrusions) regions. It is appreciated that the LCF can have improved on-axis transmission (e.g. brightness) even when some of the light absorbing coating is retained.

Any suitable method can be used to selectively remove the light absorbing material from the top surface of the protrusions (e.g. light absorbing regions) and bottom surface of the channels.

In one embodiment, the light absorbing material is removed by reactive ion etching. Reactive ion etching (RIE) is a directional etching process utilizing ion bombardment to remove material. RIE systems are used to remove organic or inorganic material by etching surfaces orthogonal to the direction of the ion bombardment. The most notable difference between reactive ion etching and isotropic plasma etching is the etch direction. Reactive ion etching is characterized by a ratio of the vertical etch rate to the lateral etch rate which is greater than 1. Systems for reactive ion etching are built around a durable vacuum chamber. Before beginning the etching process, the chamber is evacuated to a base pressure lower than 1 Torr, 100 mTorr, 20 mTorr, 10 mTorr, or 1 mTorr. An electrode holds the materials to be treated and is electrically isolated from the vacuum chamber. The electrode may be a rotatable electrode in a cylindrical shape. A counter electrode is also provided within the chamber and may be comprised of the vacuum reactor walls. Gas comprising an etchant enters the chamber through a control valve. The process pressure is maintained by continuously evacuating chamber gases through a vacuum pump. The type of gas used varies depending on the etch process. Carbon tetrafluoride ($CF_4$), sulfur hexafluoride ($ST_6$), octafluoropropane ($C_3F_8$), fluoroform ($CHF_3$), boron trichloride ($BCl_3$), hydrogen bromide (HBr), chlorine, argon, and oxygen are commonly used for etching. RF power is applied to the electrode to generate a plasma. Samples can be conveyed on the electrode through plasma for a controlled time period to achieve a specified etch depth. Reactive ion etching is known in the art and further described in U.S. Pat. No. 8,460,568; incorporated herein by reference.

In some embodiments, the step of reactive ion etching results in the absorptive regions being narrower (less than the average width) near the bottom surface 311 of the channels. Removing the light absorbing material can result in a (e.g. slight) increase in the depth of the channels. Some of the light absorbing material may remain after etching.

After removing the light absorbing coating from the bottom surface of the channels, the channels can be filled with an organic polymeric material. In some embodiments, the organic polymeric material is a polymerizable resin composition and the method further comprising (e.g. radiation) curing the polymerizable resin. Typically, the same polymerizable resin used in the manufacture of the microstructured film is utilized for filling the channels. Alternatively, a different organic polymeric material (e.g. polymerizable resin composition) is used. When a different organic polymer material (e.g. polymerizable resin composition) is used, the composition is typically selected to be index matched to the light transmissive regions. By "index matched", it is meant that the difference in refractive index between the filling material and transmissive regions is typically less than 0.1 or 0.005. Alternatively, the channels may be filled with a different organic polymeric material (e.g. polymerizable resin composition) having a difference in refractive index of greater than 0.1. In yet another embodiment, the channels are not filled with an organic polymeric material (e.g. polymerized resin). In this embodiment, the channels typically comprise air, having a refractive index of 1.0.

When the channels are filled with a cured polymerizable resin, the light control film may optionally include cover film 470 bonded to the microstructured film with adhesive 410. When the channels are filled with air, the adhesive film and cover film are typically included.

In yet another embodiment, layer 410 may be a topcoat rather than adhesive. In this embodiment, cover film 470 may not be present.

FIG. 4 shows an LCF 400 that further includes an optional cover film 470 that can be the same, or different than, base layer 260. Optional cover film 470 can be bonded to the microstructured surface with an adhesive 410. Adhesive 410 can be any optically clear adhesive, such as a UV-curable acrylate adhesive, a transfer adhesive, and the like.

Alternatively, the cover film can be contacted with the polymerizable resin utilized to fill the channels (e.g. back-filling resin). The back-filling resin is cured while in contact with the cover film, thereby bonding the cover film.

One or more of the surfaces of the cover film can optionally be primed or otherwise treated to promote adhesion with the adhesive or back-filling resin.

In typical embodiment, the thickness of the cover film can be at least about 0.025 millimeters (25 microns) and can be from about 0.05 mm (50 microns) to about 0.25 mm (250 microns). In some embodiments, the cover film is a multi-layer wavelength (e.g. color) shifting film as previously described.

In some embodiments, the LCF comprises a light absorptive layer or light reflective layer between the alternating transmissive regions and absorptive regions and the light input or output surface, other than the previously described wavelength shifting film.

In some embodiments, the light absorbing layer comprises a pigment and/or dye. For example, the base layer and/or cover film may comprise a pigment and/or dye. In yet another embodiment, an adhesive layer may be present to bond a cover film to the LCF. In this embodiment, the adhesive may comprise a pigment and/or dye. In yet another embodiment, the absorptive layer may be a coating that is applied (e.g. coated or printed) to top or bottom surface of the alternating transmissive regions and absorptive regions, a major surface of the base layer, or major surface of the cover film. In one favored embodiment, an adhesive or coating is between the cover film and alternating transmissive regions and absorptive regions. The coatings are typically not antiglare coatings or antireflective coatings. Rather, the coatings typically comprise a pigment or dye such that the coating is wavelength selective.

In another embodiment, the alternating transmissive regions comprise an absorptive material, such as a pigment or dye.

A variety of light absorptive or light reflective materials may be used. For example, visibly transparent infrared absorbing transparent conducting oxides (TCOs) both as thin films and nanoparticle powders and dispersions may be utilized. Exemplary TCOs include indium tin oxide (ITO), antimony tin oxide (ATO), gallium tin oxide (GTO), antimony zinc oxide (AZO), aluminum/indium doped zinc oxide, doped tungsten oxides like cesium tungsten oxides, and tungsten blue oxides. Other visibly transparent infrared absorbers include metal borides like lanthanum hexaborides, and conducting polymer nanoparticles like PEDOT-PSS. Metal chalcogenides like metal sulfides and selenides also absorb infrared light including, for example, copper sulfide and copper selenide nanoparticles, tungsten disulfides and molybdenum disulfides. Another class of visibly transparent tunable infrared absorbers are metallic plasmonic nanoparticles such as those made of gold, silver copper etc. Near infrared dyes and pigments may be applied to the disclosed LCFs. These dyes have low visible absorption but strong narrow band infrared absorption. Many of these dyes and pigments are organic/organometallic or metal organic in nature. Some of major classes of dyes/pigments include phthalocyanines, cyanine, transitional metal dithioline, squarylium, croconium, quniones, anthraquinones, iminium, pyrilium, thiapyrilium, azulenium, azo, perylene and indoanilines. Many of these dyes and pigments can exhibit both visible and/or infrared lights absorption as well. Further, many different types of visible dyes and colorants may be used such as acid dyes, azoic coloring matters, coupling components, diazo components. Basic dyes include developers, direct dyes, disperse dyes, fluorescent brighteners, food dyes, ingrain dyes, leather dyes, mordant dyes, natural dyes and pigments, oxidation bases, pigments, reactive dyes, reducing agents, solvent dyes, sulfur dyes, condense sulfur dyes, vat dyes. Some of the organic pigments may belong to one or more of monoazo, azo condensation insoluble metal salts of acid dyes and disazo, naphthols, arylides, diarylides, pyrazolone, acetoarylides, naphthanilides, phthalocyanines, anthraquinone, perylene, flavanthrone, triphendioxazine, metal complexes, quinacridone, polypryrrolopyrrole etc. Metal oxide pigments may be used such as metal chromates, molybdates, titanates, tungstates, aluminates, and ferrites. Many contain transition metals like iron, manganese, nickel, titanium, vanadium, antimony, cobalt, lead, cadmium, chromium etc. Bismuth vanadates are non-cadmium yellows. These pigments may be milled to create nanoparticles which may be useful where transparency and low scattering is desired. Some of the light absorbing or light reflecting particles are electrically conductive. Electrically conductive particles can be used in combination with less conductive or non-conductive particles.

Combinations of colorant can produce a wide spectrum of colors. In some embodiments, the light reflective or absorptive layer comprises little or no carbon black (e.g. less than 0.5%).

In some examples, a particulate light absorptive and/or reflective material is utilized having an average particle size less than 10 microns, or 1 micron, or less. In some embodiments, the particulate light absorptive and/or reflective material has a mean or median particle size of less than 1 micron. In some embodiments, the particulate light absorptive and/or reflective material may be dispersed in a suitable binder.

In some embodiments, the light absorptive material is an anthraquinone dyes (e.g., Pigment Yellow 147, Solvent Yellow 163, Pigment Blue 60, Pigment Red 177), perylene dyes (e.g., Pigment Black 31, Pigment Black 32, Pigment Red 149, and quinacridone dyes (e.g., Pigment Red 122); such as described in U.S. Pat. No. 9,630,384; incorporated herein by reference.

In some embodiments, the light absorptive material is an ultraviolet absorber. Ultraviolet absorbers function by preferentially absorbing ultraviolet radiation and dissipating it as thermal energy. Suitable UVAs may include: benzophenones (hydroxybenzophenones, e.g., Cyasorb 531 (Cytec)), benzotriazoles (hydroxyphenylbenzotriazoles, e.g., Cyasorb 5411, Tinuvin 329 (Ciba Geigy)), triazines (hydroxyphenyltriazines, e.g., Cyasorb 1164), oxanilides, (e.g., Sanuvor VSU (Clariant)) cyanoacrylates (e.g., Uvinol 3039 (BASF)), or benzoxazinones. Suitable benzophenones include, CYASORB UV-9 (2-hydroxy-4-methoxybenzophenone, CHIMASSORB 81 (or CYASORB UV 531) (2 hydroxy-4 octyloxybenzophenone). Suitable benzotriazole UVAs include compounds available from Ciba, Tarrytown, N.Y. as TINUVIN P, 213, 234, 326, 327, 328, 405 and 571, and CYASORB UV 5411 and CYASORB UV 237. Other suitable UVAs include CYASORB UV 1164 (2-[4,6-bis(2,4-dimethylphenyl)-I,3,5-triazin-2yl]-5(octyloxy) phenol (an exemplary triazine) and CYASORB 3638 (an exemplary benzodiazine).

When the light absorptive material is an ultraviolet absorber it is typically present in a cover film, rather than a UV curable polymerizable resin.

The concentration of light absorbing material (e.g. pigment, dye, ultraviolet absorber) can vary. In some embodiments, the concentration of light absorbing material (e.g. dye) is no greater than 10, 9, 8, 7, 6 or 5 wt. % of the base (e.g. preformed film) layer, adhesive, coating, cover film, or light transmissive (e.g. backfill) material.

The thickness of these various light absorptive layers can vary. In some embodiments, the thickness is typically at least about 0.025 millimeters (25 microns) and can be from about 0.05 mm (50 microns) to about 0.25 mm (250 microns). When the light absorptive layer is an adhesive or coating, the thickness can be less than 25 microns. For example, the thickness can be at least 5, 10, 15 or 20 microns ranging up to 50 microns. The adhesive or coating may be present as a continuous or discontinuous layer.

In some embodiments, the light reflective or light absorptive layer is a (e.g. cover or base layer) preformed film. For example, in one embodiment, the LCF comprises a cover film or base layer film that is an optical diffuser. An optical diffuser may assist in scattering light incident on the LCF, especially at high incident angles, into the light transmissive regions and toward a detector.

The LCF may further comprise other coatings typically provided on the exposed surface. Various hardcoats, antiglare coatings, antireflective coatings, antistatic, and antisoiling coatings are known in the art. See for example U.S. Pat. Nos. 7,267,850; 7,173,778, PCT Publication Nos. WO2006/102383, WO2006/025992, WO2006/025956 and U.S. Pat. No. 7,575,847.

Figure 5:
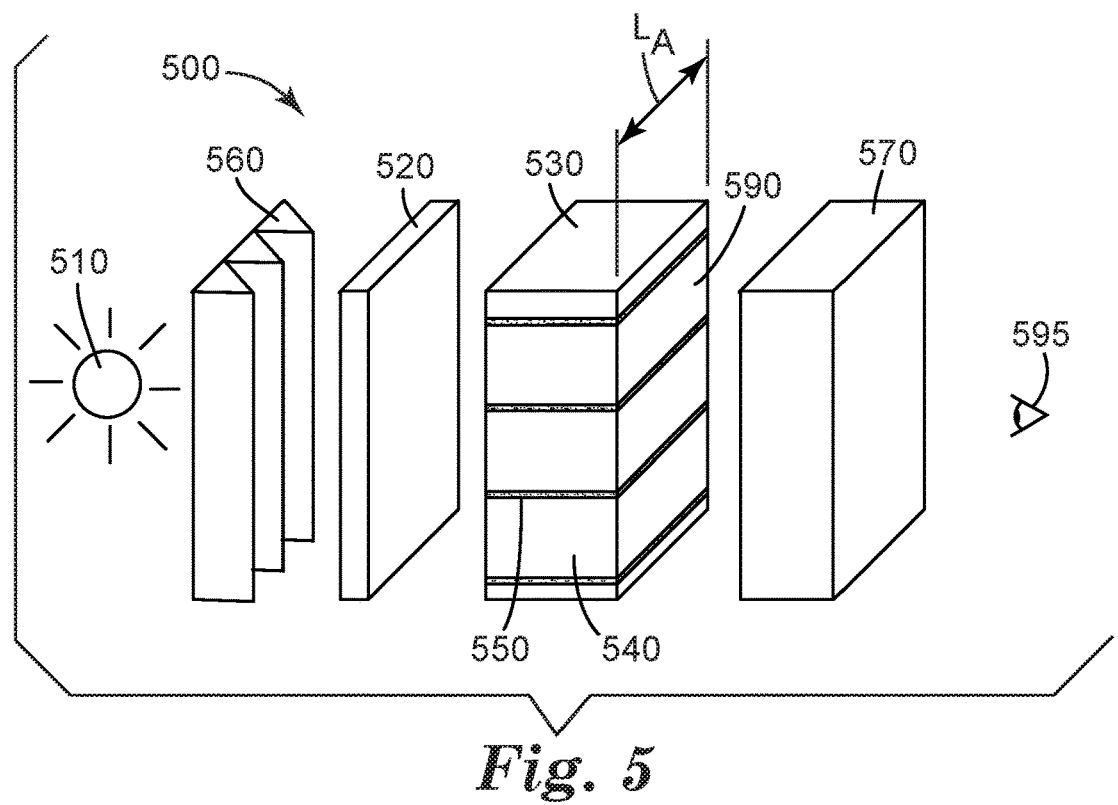
FIG. 5 is a perspective schematic of a backlit display comprising an embodied light control film.

FIG. 5 shows a perspective schematic of a backlit display 500 according to one embodiment. Backlit display 500 includes an LCF 530 comprising transmissive regions 540 and absorptive regions 550 as previously described. Such LCF has a polar cut-off viewing angle θP, as previously described, of light leaving an output surface 590 of LCF 530. Backlit display 500 includes a light source 510 configured to transmit light through LCF 530, through an image plane 520, such as an LCD panel, and on to a viewer 595. The viewing angle at which the brightness is a maximum, can depend on the polar cut-off viewing angle as previously described.

Backlit display 500 can also include an optional brightness enhancement film 560 and a reflective polarizer film 570 to further improve the brightness and uniformity of the display. Brightness enhancement film can be a prism film, such as 3M™ Brightness Enhancement Film "BEF" or Thin Brightness Enhancement Film "TBEF", available from 3M Company. Reflective polarizer film 570 can be a multilayer optical film, such as 3M™ Dual Brightness Enhancement Film "DBEF", available from 3M Company, St. Paul, MN Brightness enhancement film 560 and reflective polarizer film 570, if included, can be positioned as shown in FIG. 5.

In other embodiments, the light control film comprising transmissive regions and absorptive regions, as previously described, can be bonded to an emissive (e.g. an organic light emitting diode, or OLED) display.

In some embodiments, the LCF described herein (i.e. a first LCF) can be combined with a second LCF. In some embodiments, the second LCF may be a LCF (e.g. privacy film) such described in U.S. Pat. Nos. 6,398,370; 8,013,567; 8,213,082; and 9,335,449. In other embodiments, the second LCF is an LCF as described herein (e.g. wherein the light absorbing regions have an aspect ratio of at least 30). The first and second LCFs can be stacked in various orientations.

In one embodiment, the first and second light control films are positioned such that the absorptive regions of the first LCF are parallel and typically coincident with the absorptive regions of the second LCF. In another embodiment, the first and second light control films are positioned such that the absorptive regions of the first LCF are orthogonal with the absorptive regions of the second LCF. The first and second light control films can also be positioned such that the absorptive regions range from being parallel to orthogonal with each other at a viewing angle of 0 degrees.

In some embodiments, the combination of first and second LCF has a relative transmission (e.g. brightness) of at least 60, 65, 70, 75, 80, 85, or 90% at a viewing angle of 0 degrees. In some embodiments, the relative transmission (e.g. brightness) at a viewing angle of +30 degrees, −30 degrees, or the average of +30 and −30 degrees is less than 25, 20, 15, 10, or 5%. In some embodiments, the average relative transmission (e.g. brightness) for viewing angles ranging from +35 to +80 degrees, −35 degrees to −85 degrees, or the average of these ranges is less than 10, 9, 8, 7, 6, 5, 4, 3, 2, or 1%.

In some embodiments, this combination of LCF has a relative transmission (e.g. brightness) of at least 60, 65, 70, 75, 80, 85, or 90% at a viewing angle of 0 degrees. In some embodiments, the relative transmission (e.g. brightness) at a viewing angle of +30 degrees, −30 degrees, or the average of +30 and −30 degrees is less than 25, 20, 15, 10, or 5%.

When the channels are filled with air, the relative transmission (e.g. brightness) at higher viewing angles can be lower, and thus the film can exhibit improved privacy.

In some embodiments, the light control films described herein are particularly useful as a component of a display device as a so-called hybrid privacy filter. The hybrid privacy filter may be used in conjunction with a display surface, wherein light enters the hybrid privacy filter on the input side of the light control film and exits the hybrid privacy filter or film stack at the color shifting film. A great number of electronic devices with displays may be used in conjunction with the present invention including laptop monitors, external computer monitors, cell phone displays, televisions, smart phones, automotive center information displays, automotive driver information displays, automotive side mirror displays (also referred to as e-mirrors), consoles, or any other similar LCD, OLED, micro-LED, or mini-LED based display. An additional benefit to applying hybrid privacy filters to a display is for contrast enhancement.

Other types of backlit display imaging devices are also contemplated, including non-electronic displays such as sunglasses, document coversheets, console switches in auto and aviation applications, airplane cockpit controls, helicopter cockpit controls, windows and any number of others.

In further embodiments, the light control film described herein can be useful as coverings for glass and solar panels. For instance, the light control films may be laminated onto or within fenestrations. The fenestrations may be selected from a glass panel, a window, a door, a wall, and a skylight unit. These fenestrations may be located on the outside of a building or on the interior. They may also be car windows, train windows, airplane passenger windows, ATMs, or the like. Advantages of incorporating these film stacks into fenestrations include reduced IR transmission (which may lead to increased energy savings), ambient light blocking, privacy, and decorative effects.

In some embodiments, the light control films (LCFs) described herein may be part of an optical communication system. The "optical communication system" as referred to herein is a system that is for communication of light over a distance from a light source through a disclosed LCF to a target, where the target may include a detector or human eye and the light source my include ambient light. Exemplary light sources include a light emitting diode (LED) that emit UV, visible or NIR, a laser light source including VCSEL (vertical cavity surface emitting laser), a halogen light source, an incandescent light source, a metal halide light source, a tungsten light source, a mercury vapor light source, a short arc xenon light source, or the sun (solar). In some cases, the LCFs disclosed herein may be part of an optical communication system with a detector system. In some cases, the detector system may provide various types of outputs, such as electronic signals, when receiving light passing through the LCF of the optical communication system. A detector system includes a detector that is sensitive to wavelengths in a detection wavelength range and an LCF disposed on the detector.

In some embodiments, the detector is or includes a photovoltaic device. The detector may be configured to detect solar radiation, for example, to charge a battery. In such cases, the detector is or may include a solar battery, a solar cell, silicone photodiode, or a solar detector. In some cases, the detector may be the detector in a (e.g. visible or near infrared) camera for detecting and/or recording an image. In some cases, the detector may be a in a camera or camera system. Other detectors include CMOS (complementary metal-oxide semiconductor) and CCD (charge-coupled device) detectors. Typical applications of light detectors (also referred to herein as sensors) include gesture recognition, iris recognition, face recognition, remote control and autonomous vehicles, ambient light sensor, proximity sensor, heart rate, blood oxygen, glucose or other biological sensing, 3D depth camera with time of flight or structured light, security camera.

Figure 7:
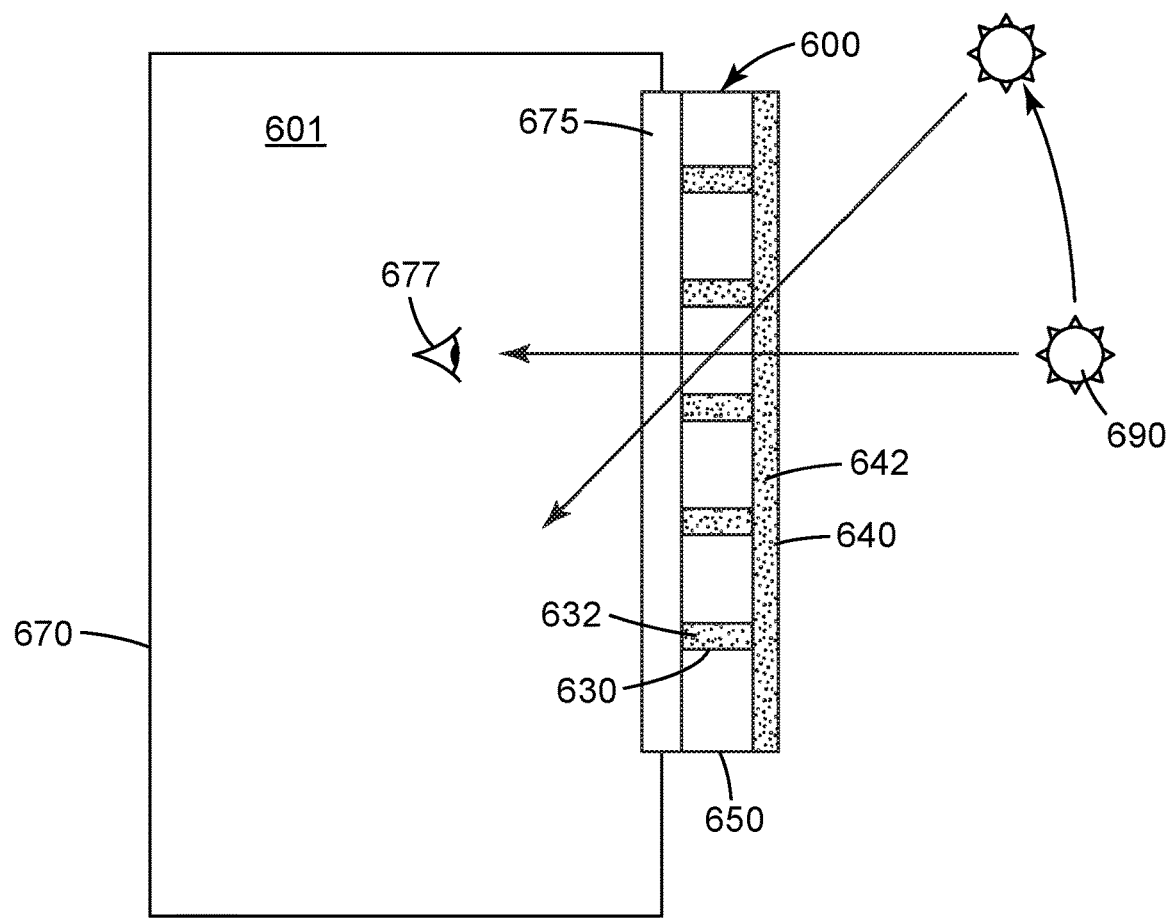
FIG. 7 is a schematic cross-sectional view of an exemplary light control film applied to a window of an enclosure, such as a building, a house or a vehicle.

In some cases, the light control films (LCFs) disclosed herein may be part of an optical communication system including an optical construction combined with, for example, a window as shown in FIG. 7. In this example, the LCF 600 is a part of an optical construction 601 with a natural light source such as sun light 690. In particular, FIG. 7 shows an exemplary application of a disclosed LCF applied to a window to an enclosure, such as a building, a house or a vehicle. LCF 600 may be disposed on a window substrate 675 of a building, a house, a car or any enclosure 670. The LCF 600 includes an optical film 650 that includes a plurality of spaced apart first absorptive regions 630 and an optional second (e.g. cover film) region 640 adjacent at least a portion of at least one first region 630. The first regions 630 comprise a first absorptive material 632 and the second region 640 may include a second material 642.

In a favored embodiment, the LCF window film exhibits high transmission of visible light in combination with low transmission of both UV light and NIR light.

The transmission of ultraviolet light and infrared light by the first absorptive regions 630 vary as a function of the incidence angle of the light. In particular, when the sun light 690 is incident perpendicularly to the LCF 600, the infrared light and the visible light may both be transmitted through the optical film 650. However, as the incidence angle of the light from the sun 690 increases, the amount of the infrared light transmitted through the LCF 600 decreases until the incidence angle reaches the viewing angle θP from which point on substantially all the infrared light is blocked by the first material 632. That is, during the morning hours when the infrared portion of the sun light 690 is relatively small and the sun light 690 is incident on the window at normal incidence angle, most of the infrared light may be transmitted by the LCF 600. On the other hand, close to noon, when the infrared portion of the sun light 690 is relatively large and the incident angle of the sun light 690 is increased close to or beyond the viewing Angle 2θv of the LCF 600, very little of the incident infrared light is transmitted by the LCF 600 and finally blocked so that the viewer or resident 677 inside of the building or house 670 may not be exposed to the hot infrared light. Thus, the LCF 600 can reduce exposure to ultraviolet and infrared light.

Figure 8:
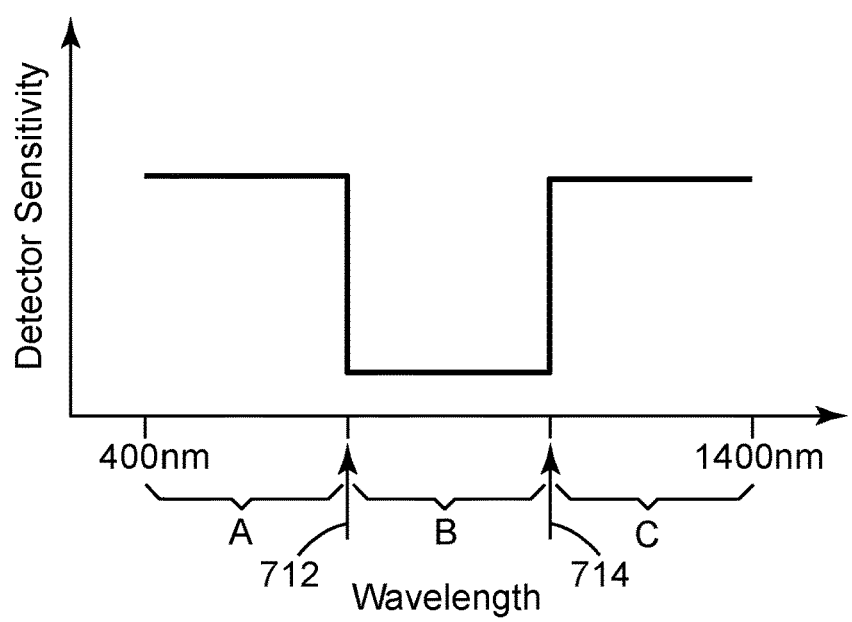
FIG. 8 is a schematic plot of transmission of a light control film vs. wavelength.

FIG. 8 schematically shows the relation between the detector sensitivity and wavelength illustrating that the detector is sensitive to wavelengths in the detection wavelength range. As shown in FIG. 8, each first region of a disclosed LCF may have a substantially high transmission in a predetermined first wavelength range "A", a substantially low transmission in a predetermined second wavelength range "B", and a substantially high transmission in a predetermined third wavelength range "C", where the second wavelength range B is disposed between the first and third wavelength ranges A and C, respectively. In some cases, the second wavelength range B is about 20 nm wide from a first wavelength 712 to a second wavelength 714 and centered on a laser visible emission wavelength, the first wavelength range A is from about 400 nm to about the first wavelength 712, and the third wavelength range C is from about the second wavelength 714 to about 1400 nm. The laser visible emission wavelength may be at least one of 442 nm, 458 nm, 488 nm, 514 nm, 632.8 nm, 980 nm, 1047 nm, 1064 nm, and 1152 nm. In other examples, the laser visible emission wavelength is in a range from about 416 nm to about 1360. In further examples, the LCF further may include a plurality of spaced apart second regions alternating with the plurality of first regions and each second region may have a substantially high transmission in each of the predetermined first, second and third wavelength ranges. In other example, each second region may have a substantially low transmission in either/both the predetermined first or/and third wavelength ranges. In some cases, the LCF has a viewing angle of less than about 60 degrees, or 50 degrees, or 40 degrees, or 30 degrees, or 20 degrees in the predetermined second wavelength range.

In another exemplary application, the LCFs disclosed herein may be a part of an optical communication system with a separate light source such as laser light source as shown in FIG. 8.

Figure 9:
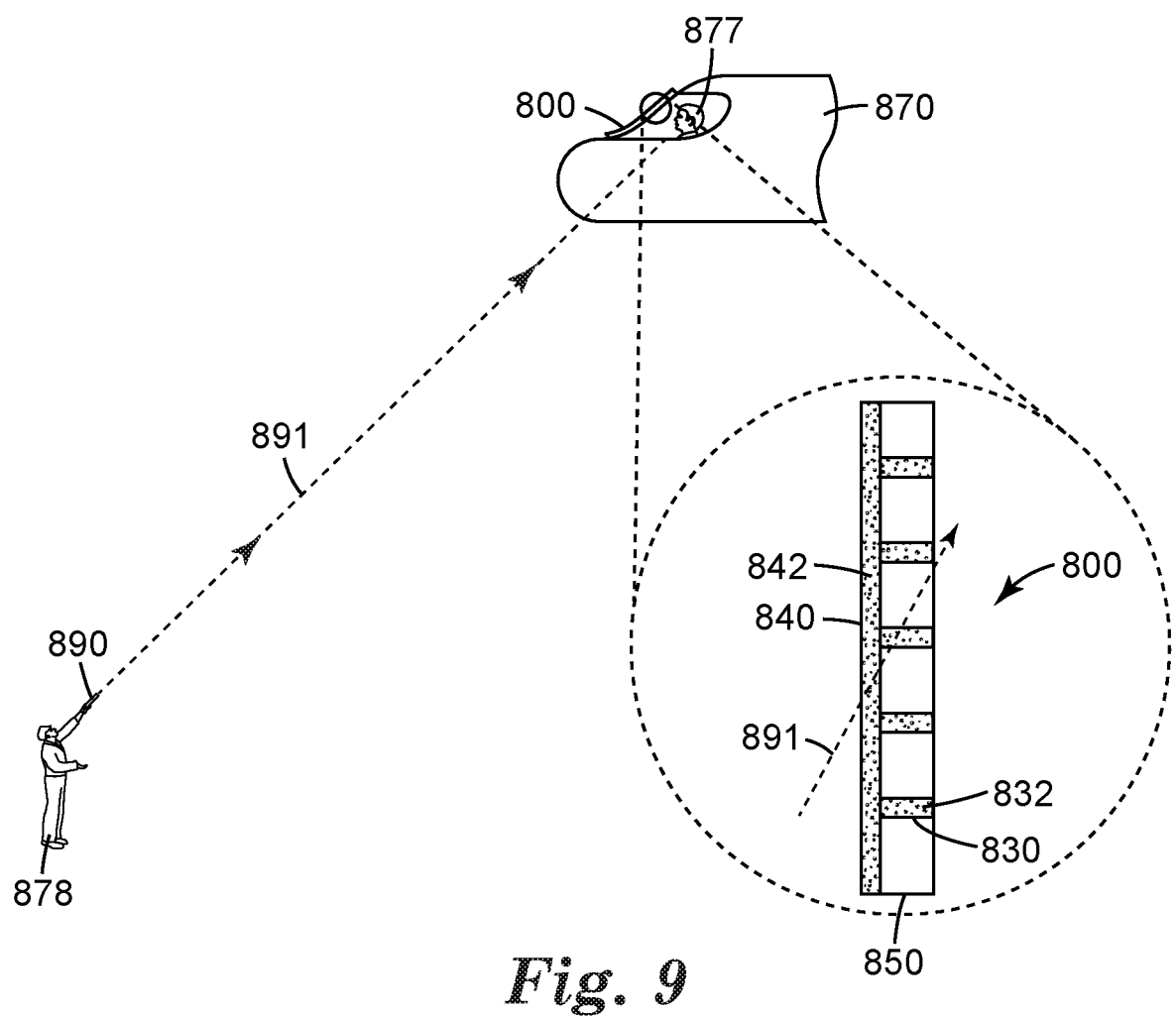
FIG. 9 is a schematic view of an exemplary application where a light control film is applied to a plane or an aircraft.

In particular, FIG. 9 shows an exemplary application where a LCF is applied to a plane or an aircraft laser strike defense system to block an incoming or incident light in a predetermined wavelength range. An LCF 800 may be attached to, for example, a plane, an airplane or aircraft 870, etc. and desirably, attached to a surface (such as a window) of the plane, airplane or aircraft 870. The LCF 800 includes an optical film 850 that includes a plurality of spaced apart first adsorptive regions 830 and optional second (e.g. cover film) region 840 adjacent at least a portion of at least one of the first regions 830. The first regions 830 comprise a first absorptive material 832 and the second region 840 includes a second material 842.

When laser light 891 is incident on the LCF 800, the second (e.g. cover film) material 842 absorbs or/and reflects at least a part of ultraviolet light and infrared wavelength ranges regardless of the incidence angle of the light 891. Furthermore, the second (e.g. cover film) region 840 transmits in a range of the visible wavelengths that include the laser light 891 wavelength, but the transmission of the visible light through the first regions 830 vary as a function of an incidence angle of the light. When the light is incident perpendicularly to the surface of the LCF 800, the visible light can be transmitted through the optical film 850. However, outside viewing angle, OP (refer to FIG. 1b), the visible light is blocked by the first absorptive material 832 in the first regions 830. Therefore, when using the LCF 800 on the plane or aircraft 870, the visible light from the laser light 891 within the viewing angle θP can be transmitted by the LCF 800 but the ultraviolet light and the infrared light from the laser light 891 may not be transmitted by the LCF 800 or only a restricted amount of the ultraviolet light and infrared light, desirably less than about 10% the ultraviolet light and infrared light respectively may be transmitted by the LCF 800. The visible light can be transmitted by the LCF 800 as a function of an incidence angle including a wavelength of the light. Laser striker 878 may attack the plane or aircraft 870, for example, using a green laser 890 in order to obstruct a view of a pilot 877. Normally, the wavelength of the green color is about from 495 nm to 570 nm. Therefore, when LCF 800 includes a first absorptive material 832 that blocks the range of the wavelengths from 495 nm to 570 nm of the light, pilot 877 on the plane or aircraft 870 is not affected by the green laser attack from the laser striker 878 on the ground.

Figure 10:
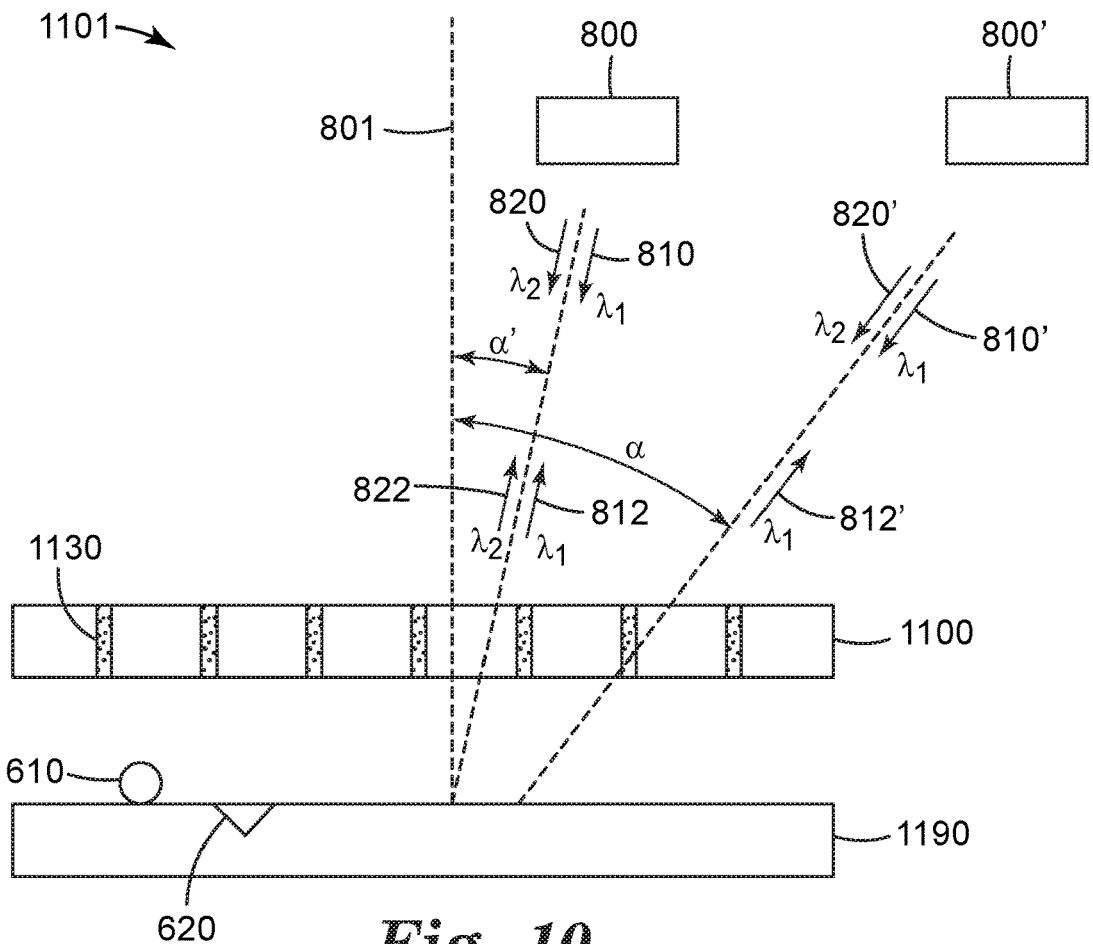
FIG. 10 is a schematic cross-sectional view of an exemplary optical communication system including a light control film combined with a retroreflector.

In some cases, the disclosed light control films (LCFs) may be utilized in combination with retroreflectors. For example, FIG. 10 shows a retroreflective system 1101 that includes a retroreflective sheet 1190 for retroreflecting light, and a LCF 1100 disposed on the retroreflective sheet 1190. In general, retroreflector sheet 1190 is configured to retroreflect light for a range of incident wavelengths and angles. For example, retroreflector sheet 1190 may be configured to retroreflect light for different incident wavelengths $\lambda_1$ and $\lambda_2$ and different incident angles α and α'. The addition of LCF 1100 results in system 1101 having modified retroreflective properties. For example, for a larger angle α and a smaller angle α', the viewing angle 2θv of LCF 1100 may be such that for the smaller incident angle α', LCF 1100 substantially transmits light at both wavelengths $\lambda_1$ and $\lambda_2$, but for the larger incident angle α, LCF may substantially transmit light having wavelength $\lambda_1$ and substantially absorb light having wavelength $\lambda_2$. For example, in some cases, the viewing angle θP of LCF 1100 may be greater than α' and less than α. As another example, retroreflective system 1101 is so configured that for a first wavelength $\lambda_1$, lights 810 and 810' incident on LCF 1100 at corresponding first and second angles of incidence α' and α, are both retroreflected as respective retroreflected lights 812 and 812'. Furthermore, for a second wavelength $\lambda_2$, light 820 incident on the LCF at the first incidence angle α' is retroreflected at retroreflected light 822, but light 820' incident on the LCF at the second incidence angle α is not retroreflected. In such cases, light 820' is absorbed by LCF 1100 when it is first incident on the LCF and, in some cases, after it is partially transmitted by the LCF and retroreflected by the retroreflective sheet. In some cases, LCF 1100 includes a larger first viewing angle for the first wavelength and a smaller viewing angle for the second wavelength. In some cases, the first angle of incidence α' is substantially equal to zero relative to a line 801 normal to a plane of the LCF 1100. In some cases, retroreflective sheet 1190 includes microsphere beads 610 for retroreflecting light. In some cases, retroreflective sheet 1190 includes corner cubes 620 for retroreflecting light. In some cases, LCF 1100 includes a plurality of spaced apart first regions 1130, where each first region 1130 has a substantially low transmission at the second wavelength $\lambda_2$, but not at the first wavelength $\lambda_1$.

In some cases, the light control film (LCF) may be used as part of an optical communication system having a sensor, more specifically, an IR sensor in order to improve signal to noise performance and enable improved directional sensing. In this example, the first material is spectrally selective in at least a part of infrared light range and in some cases, the second material may be spectrally selective in at least a part of at least one of ultraviolet light and visible light ranges. More desirably, the second material is spectrally selective in both ultraviolet light and visible light ranges. When using the LCF, noises like ultraviolet light and visible light from the IR sensor are absorbed through the second material regardless of the incidence angle of light. The transmission of the ultraviolet light and visible light from a light source passing through the second region is uniform and desirably, less than about 10% regardless of the incidence angle of the light. However, the second region may transmit a range of the infrared light from light source but the transmission of the infrared light through the first regions vary as a function of an incidence angle of the light. When light is incident perpendicularly to the surface of the LCF, the infrared light may be transmitted through the optical film. However, outside the viewing angle, 2θv, the infrared light is blocked by the first material in the first regions. Therefore, the disclosed system provides an IR sensor with substantially reduced noise and substantially improved directional sensing.

Figure 11:
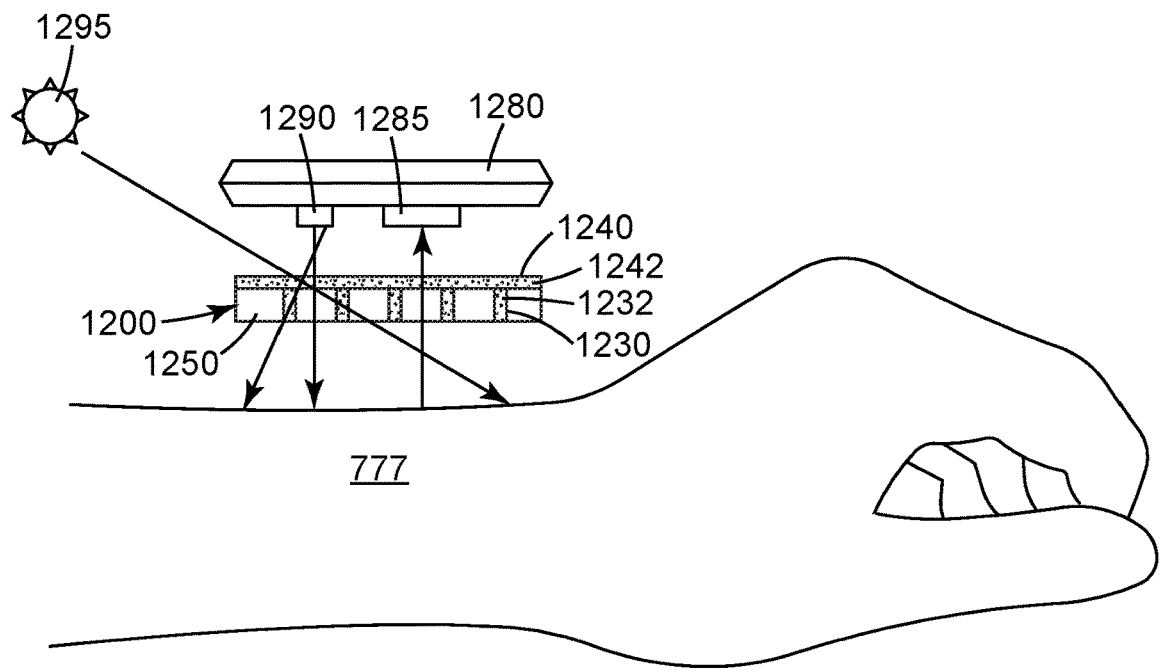
FIG. 11 is a schematic cross-sectional view of an exemplary wearable optical communication system including a light control film and a wrist watch with a pulse sensor.

In another case, the LCF can be used in a part of an optical communication system with a sensor, more specifically a pulse sensor applied to a wrist watch as shown in FIG. 11. In particular, FIG. 11 shows an exemplary application of an LCF applied to a wrist watch with a pulse sensor. An LCF 1200 may be attached to a wearable wrist watch 1280 or any wearable device and desirably, attached to a surface of the wearable watch 1280. The LCF 1200 includes an optical film 1250 that includes a plurality of first absorptive regions 1230 and optionally a second (e.g. cover film) region 1240 adjacent at least a portion of a least one first regions 1230. The first regions 1230 comprise a first absorptive material 1232 and the second region 1240 may include a second material 1242. The first material 1232 or the second (e.g. cover film, adhesive or coating) material 1242 may be any suitable material such that the first material 1232 is spectrally selective in at least a part of visible light range from the light source, for example, LED 1290 and the second material 1242 is spectrally selective in at least a part of at least one of ultraviolet light and infrared light ranges from the LED 1209. More desirably, the second material 1242 is spectrally selective in both ranges in the ultraviolet light and infrared light ranges. When using the LCF 1200, noises like ultraviolet light and infrared light from the perspective of a pulse sensor 1285 are absorbed through the second material 1242 regardless of the incidence angle of the light from light source such as sun light 1295 or LED 1290. The transmission of the ultraviolet light and infrared light from the light source passing through the second region 1240 is uniform and desirably, less than about 10%, regardless of the incidence angle of the light. However, the second region 1240 transmits a range of the visible light from LED 1290 but the transmission of the visible light through the first regions 1230 varies as a function of the incidence angle of the light. When the light from LED 1290 is incident perpendicularly on the surface of the LCF 1200, the visible light may be transmitted through the optical film 1250. However, the first material 1232 may block or decrease the sun light 1295 or ambient visible light from other light sources that are incident with relatively high incidence angle to the wrist 777 of the person wearing the device so that the LCF 1200 may improve signal (mainly visible light from LED that is incident within a viewing angle) to noise (for example, ultraviolet light or infrared light or ambient visible light from, for example, sunlight, other ambient light source that is incident outside viewing angle) ratio.

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification. The foregoing description can be better understood by consideration of the embodiments shown by the testing results and examples that follow.

EXAMPLES

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Co., St. Louis, Missouri.

The following is a list of materials used throughout the Examples, as well as their brief descriptions and origins.

The components of Resin A used in the cast-and-cure microreplication process (Preparative Example 1) as well as the index-matched backfill material in Examples 2 and Examples 4-8 are listed in Table 1 below. The raw materials for the layer-by-layer coating are listed in Table 2 below. The raw materials for reactive ion etching are listed in Table 3 below.

TABLE 1

Raw materials for Resin A

| Material | Abbreviation | Available From |
|---|---|---|
| Aliphatic urethane diacrylate Viscosity 5900 mPa · s at 60° C. Tensile Strength 2060 psi Tg = −7° C. | Photomer 6010 | BASF |
| Ethoxylated (10) bisphenol A diacrylate | SR602 | Sartomer (Exton, PA) |
| Ethoxylated (4) bisphenol A diacrylate | SR601 | Sartomer (Exton, PA) |
| Trimethylolpropane triacrylate | TMPTA | Cytec Industries (Woodland Park, NJ) |
| Phenoxyethyl Acrylate | PEA (Etermer 2010) | Eternal Chemical Co., Ltd., Kaohsiung, Taiwan |
| 2-Hydroxy-2-methylpropiophenone photoinitiator | Darocur 1173 | BASF Corporation (Florham Park, New Jersey) |
| Diphenyl(2,4,6-trimethylbenzoyl)phosphine oxide photoinitiator | TPO | BASF Corporation (Florham Park, New Jersey) |
| Irgacure 1035 anti-oxidant | I1035 | BASF Corporation (Florham Park, New Jersey) |

TABLE 2A

Raw materials for the layer-by-layer coatings

| Material | Abbreviation | Source |
|---|---|---|
| Poly(diallyl-dimethyl ammonium chloride), molecular weight 100-200K | PDAC | Sigma-Aldrich Co. (St. Louis, Missouri) |

TABLE 2A-continued

Raw materials for the layer-by-layer coatings

| Material | Abbreviation | Source |
|---|---|---|
| Dehyquart CC6 cationic polymer | CC6 | BASF(Florham Park, New Jersey) |
| CAB-O-JET ® 200 carbon black nano-pigment, 130 nm diameter, sulfonate functionalized | COJ200 | Cabot Corporation (Boston, Massachusetts) |
| CAB-O-JET ® 300 carbon black nano-pigment, 130 nm diameter carboxylate functionalized | COJ300 | Cabot Corporation (Boston, Massachusetts) |
| CAB-O-JET ® 352K carbon black nano-pigment, 70-80 nm diameter, carboxylate functionalized | COJ352K | Cabot Corporation (Boston, Massachusetts) |
| Sodium chloride | NaCl | Sigma-Aldrich Co. (St. Louis, Missouri) |
| Sodium hydroxide (1M in water) | NaOH | Avantor Performance Materials (Central Valley, PA) |

The particle sizes reported for carbon black is the aggregate particle size.

TABLE 2B

Organic Polymer Dispersions for the layer-by-layer coatings

| Material | Abbreviation | Source |
|---|---|---|
| Sancure ® 20051 cationic polyurethane dispersion (also goes by tradename PrintRite ® DP675) | SC20051 | Lubrizol (Cleveland, Ohio) |
| Sancure ® 20072 cationic polyurethane dispersion (also goes by tradename PrintRite ® DP676) | SC20072 | Lubrizol (Cleveland, Ohio) |
| Witcobond ® UCX-214 cationic polyurethane dispersion | UCX214 | Lanxess Solutions U.S. Inc. (Fords, Woodbridge Township, New Jersey) |
| Picassian ® AC-181 cationic acrylic dispersion | AC181 | Stahl Europe b.v. (Waalwijk, the Netherlands) |
| Raycat ® 65124 cationic acrylic dispersion | RC65124 | Specialty Polymers, Inc. (Chester, South Carolina) |

Method for Measuring Particle Size and Zeta Potential of Organic Polymer Dispersions For both measurements, the organic polymer dispersions, as received in water, were diluted to an appropriate concentration (typically 0.1 wt % to 0.01 wt % solids) with a solution of 1 mM potassium chloride (KCl).

The $10^{th}$, $50^{th}$, and $90^{th}$ percentiles (d10, d50, and d90, respectively) of the particle size distribution weighted by intensity were measured via dynamic light scattering (DLS) with a Brookhaven Instruments Corp. (Holtsville, New York) ZetaPALS instrument. The median particle size, weighted by intensity, is the d50 value. Zeta potential was measured with the same instrument.

TABLE 2C

Particle Size and Zeta Potential of Organic Polymer Dispersions

| Abbreviation | d10 (nm) | d50 (nm) | d90 (nm) | Zeta Potential (mV) |
|---|---|---|---|---|
| SC20051 | 19 | 30 | 48 | +38 |
| SC20072 | 97 | 157 | 255 | +51 |
| UCX214 | 29 | 49 | 84 | +43 |
| AC181 | 122 | 179 | 265 | +30 |
| RC65124 | 96 | 159 | 195 | +33 |

TABLE 3

Raw materials for reactive ion etching

| Material | Abbreviation | Source |
|---|---|---|
| Oxygen (UHP compressed gas) | $O_2$ | Oxygen Service Company (St Paul, Minnesota) |
| Argon (UHP compressed gas) | Ar | Oxygen Service Company (St Paul, Minnesota) |

Preparative Example 1 (PE1): Preparation of "Square Wave" Microstructured Film

A diamond (29.0 µm tip width, 3° included angle, 87 µm deep) was used to cut a tool having a plurality of parallel linear grooves. The grooves were spaced apart by a pitch of 62.6 microns.

Resin A was prepared by mixing the materials in Table 4 below.

TABLE 4

Composition of Resin A used to make microstructured film

| Material | Parts by Weight |
|---|---|
| Photomer 6010 | 60 |
| SR602 | 20 |
| SR601 | 4.0 |
| TMPTA | 8.0 |
| PEA (Etermer 2010) | 8.0 |
| Darocur 1173 | 0.35 |
| TPO | 0.10 |
| 11035 | 0.20 |

A "cast-and-cure" microreplication process was carried out with Resin A and a tool, as described above. The line conditions were: resin temperature 150° F., die temperature 150° F., coater IR 120° F. edges/130° F. center, tool temperature 100° F., and line speed 70 fpm, Fusion D lamps (available from Fusion UV Systems, Gaithersburg, MD), with peak wavelength at 385 nm, were used for curing and operated at 100% power. The resulting microstructured film comprised a plurality of protrusions (e.g. light transmissive regions) separated by channels as illustrated in FIG. 2. The base layer 260 was PET film (3M, St. Paul, MN), having a thickness of 2.93 mils (74.4 microns). The side of the PET film that contacts the resin was primed with a thermoset acrylic polymer (Rhoplex 3208 available from Dow Chemical, Midland, MI). The land layer (L) of the cured resin had a thickness of 8 microns. The microstructured film is a topographical inverse of the tool such that the protrusions of the microstructured film are a negative replication of the grooves of the tool. The protrusions have a wall angle of 1.5 degrees resulting in the protrusions being slightly tapered (wider at the light input surface and narrower at the light output surface). The channels of the microstructured film are a negative replication of the uncut portions of the tool between the grooves.

Method for Making Layer-by-Layer Self-Assembled Coatings on Microstructured Film Layer-by-layer self-assembled coatings were made using an apparatus purchased from Svaya Nanotechnologies, Inc. (Sunnyvale, CA) and modeled after the system described in U.S. Pat. No. 8,234,998 (Krogman et al.) as well as Krogman et al. Automated Process for Improved Uniformity and Versatility of Layer-by-Layer Deposition, *Langmuir* 2007, 23, 3137-3141.

The apparatus comprises pressure vessels loaded with the coating solutions. Spray nozzles with a flat spray pattern (from Spraying Systems, Inc., Wheaton, Illinois) were mounted to spray the coating solutions and rinse water at specified times, controlled by solenoid valves. The pressure vessels (Alloy Products Corp., Waukesha, WI) containing the coating solutions were pressurized with nitrogen to 30 psi, while the pressure vessel containing deionized (DI) water was pressurized with air to 30 psi. Flow rates from the coating solution nozzles were each 10 gallons per hour, while flow rate from the DI water rinse nozzles were 40 gallons per hour. The substrate to be coated was adhered at the edges with epoxy (Scotch-Weld epoxy adhesive, DP100 Clear, 3M Company, St. Paul, MN) to a glass plate (12"× 12"×⅛" thick) (Brin Northwestern Glass Co., Minneapolis, MN), which was mounted on a vertical translation stage and held in place with a vacuum chuck. In a typical coating sequence, the polycation (e.g., PDAC) solution was sprayed onto the substrate while the stage moved vertically downward at 76 mm/sec. Next, after a dwell time of 12 sec, the DI water was sprayed onto the substrate while the stage moved vertically upward at 102 mm/sec. The substrate was then dried with an airknife at a speed of 3 mm/sec. Next, the polyanion (e.g., pigment nanoparticles) solution was sprayed onto the substrate while the stage moved vertically downward at 76 mm/sec. Another dwell period of 12 sec was allowed to elapse. The DI water was sprayed onto the substrate while the stage moved vertically upward at 102 mm/sec. Finally, the substrate was then dried with an airknife at a speed of 3 mm/sec. The above sequence was repeated to deposit a number of "bi-layers" denoted as (Polycation/Polyanion)$_n$ where n is the number of bi-layers. The coated substrate (e.g. polymer film) was peeled off of the glass substrate prior to subsequent processing.

Method for Reactive Ion Etching Microstructured Film

Reactive ion etching (RIE) was performed in a parallel plate capacitively coupled plasma reactor. The chamber has a central cylindrical powered electrode with a surface area of 18.3 ft$^2$. After placing the microstructured film on the powered electrode, the reactor chamber was pumped down to a base pressure of less than 1.3 Pa (2 mTorr). A mixture of Ar (argon) and O$_2$ (oxygen) gas was flowed into the chamber, each at a rate of 100 SCCM. Treatment was carried out using a plasma enhanced CVD method by coupling RF power into the reactor at a frequency of 13.56 MHz and an applied power of 6000 watts. Treatment time was controlled by moving the microstructured film through the reaction zone. Following the treatment, the RF power and the gas supply were stopped and the chamber was returned to atmospheric pressure. Additional information regarding materials, processes for applying cylindrical RIE, and further details around the reactor used can be found in U.S. Pat. No. 8,460,568 B2.

Method for Back-Filling Channels of the Microstructured Film

The channels were back-filled with Resin A used in PE1 by pipetting the resin between the microstructured film surface and a piece of unprimed, 2 mil-thick PET film placed on top, using a hand roller to apply pressure to the top PET film, and then UV curing with a Heraeus (Hanau, Germany) belt conveyer UV processor (Model #DRS(6)) with an 'H' bulb at 500 Watt power. Specifically, the samples were sent through the UV curing station three times at a conveyer speed of 50 ft/min. Next, the top PET film was stripped off the microstructured film by hand.

Method for Measuring the Luminance Profile from a Diffuse Light Source

A sample of film was placed on a Lambertian light source. When the light transmissive regions are tapered, the film is positioned such that the widest portion of the tapered regions are closer to the light source. An Eldim L80 conoscope (Eldim S. A., HEROUVILLE SAINT CLAIR, France) was used to detect light output in a hemispheric fashion at all polar and azimuthal angles simultaneously. After detection, a cross section of transmission (e.g. brightness) readings were taken in a direction orthogonal to the direction of the louvers (denoted as a 0° orientation angle), unless indicated otherwise. Relative transmission (i.e. brightness of visible light) is defined as the percentage of on-axis luminance, at a certain viewing angle, between a reading with film and a reading without the film.

The Lambertian light source consisted of diffuse transmission from a light box having the baseline luminance profile depicted in FIG. 6. The light box was a six-sided hollow cube measuring approximately 12.5 cm×12.5 cm×11.5 cm (L×W×H) made from diffuse polytetrafluomethylene (PTFE) plates of ~6 mm thickness. One face of the box was chosen as the sample surface. The hollow light box had a diffuse reflectance of ~0.83 measured at the sample surface (e.g. ~83%, averaged over the 400-700 nm wavelength range). During testing, the box was illuminated from within through a ~1 cm circular hole in the bottom of the box (opposite the sample surface, with the light directed toward the sample surface from inside). The illumination was provided using a stabilized broadband incandescent light source attached to a fiber-optic bundle used to direct the light (Foster DCR-II with a 1 cm diameter fiber bundle extension from Schott-Fostec LLC, Marlborough Mass. and Auburn, N.Y.).

Method for Measuring the Transmission for Ultraviolet and Near Infrared Light

The transmission of ultraviolet (320-400 nm) and near infrared light (700-1400 nm) light was measured with a Lambda 1050 spectrophotometer (Perkin Elmer, Waltham, Massachusetts) with a variable angle transmittance sample holder (Catalog #PELA9042). Values reported in the Examples are arithmetic averages of the transmission from 320-400 nm (ultraviolet) or 700-1400 nm (near infrared) as specified and at either a +30° or +60° incidence angle as specified, measured at a single location on each sample.

Method for Cross-Sectional Scanning Electron Microscopy (SEM)

Cross-sections were prepared via freeze fracturing using liquid nitrogen. SEM images were acquired with a Hitachi SU-8230 (Hitachi, Ltd., Tokyo, Japan) instrument.

Comparative Example 1-2 (CE1-CE-2) are Commercially Available Light Control Films Comparative Example 3 (CE3)

Two sections (each 3"×3") of the film from CE1 were overlaid and laminated together with an optically clear adhesive (8171, 3M Company, St. Paul, MN). One sheet was oriented perpendicular to the other. That is, the original directions of the channels were offset by 90° between the top sheet and bottom sheet.

Preparative Example 2 (PE2): Preparation of Coating Solutions

PDAC was diluted from 20 wt % to a concentration of 0.32 wt % with deionized (DI) water. CAB-O-JET® 352K (COJ352K) was diluted to a concentration of 0.10 wt % with DI water. NaCl was added to both the PDAC solution and pigment suspension to a concentration of 0.05M. 1M NaOH was added to the COJ352K suspension to a pH of 9. pH values were measured with a VWR (West Chester, PA) pH electrode (Catalog #89231-582), which was calibrated with standard buffer solutions.

Example 1 (EX1): Carbon Black Nano-Pigment, 130 nm Diameter, not Back-Filled

A sheet of microstructured film as made in PE1 was cut to a size of 9"×10" and corona treated by hand using a BD-20AC Laboratory Corona Treater (Electro-Technic Products, Chicago, IL) to prevent the aqueous coating solutions from beading up and dewetting. PDAC and CAB-O-JET® ® 200 coating solutions were made as described in PE2. The corona-treated film was coated with (PDAC/COJ200)$_{10}$ using the "Method for Making Spray Layer-by-Layer Self-Assembled Coatings on Microstructured Film". This coated film was subjected to reactive ion etching (RIE) at a power of 6000 W for a duration of 210 s. An equivalent coating deposited onto a glass plate had a thickness of 166 nm as measured with a Dektak XT stylus profilometer (Bruker Nano, Inc., Tucson, AZ) after scoring the coating with a razor blade. Based on the thickness of the equivalent coating deposited on glass, the aspect ratio of the absorptive regions (e.g. louvers) was approximately 525:1.

Example 2 (EX2): Carbon Black Nano-Pigment, 130 nm Diameter, Back-Filled

A sheet of microstructured film as made in PE1 was cut to a size of 9"×10" and corona treated by hand using a BD-20AC Laboratory Corona Treater (Electro-Technic Products, Chicago, IL) to prevent the aqueous coating solutions from beading up and dewetting. PDAC and CAB-O-JET® 200 coating solutions were made as described in PE2. The corona-treated film was coated with (PDAC/COJ200)$_{20}$ using the "Method for Making Spray Layer-by-Layer Self-Assembled Coatings on Microstructured Film". This coated film was subjected to reactive ion etching (RIE) at a power of 6000 W for a duration of 210 s. Next, the channels were back-filled using the "Method for Back-Filling Channels of the Microstructured Film" described above. An equivalent coating deposited onto a glass plate had a thickness of 326 nm as measured with a Dektak XT stylus profilometer after scoring the coating with a razor blade.

Example 3 (EX3): Carbon Black Nano-Pigment, 70-80 nm Diameter, not Back-Filled

A sheet of microstructured film as made in PE1 was cut to a size of 9"×10" and corona treated by hand using a BD-20AC Laboratory Corona Treater (Electro-Technic Products, Chicago, IL) to prevent the aqueous coating solutions from beading up and dewetting. PDAC and CAB-O-JET® 352K coating solutions were made as described in PE2. The corona-treated film was coated with (PDAC/COJ352K)$_{20}$ using the "Method for Making Spray Layer-by-Layer Self-Assembled Coatings on Microstructured Film". The coated film was then subjected to reactive ion etching (RIE) at a power of 6000 W for a duration of 200 s. An equivalent coating deposited onto a glass plate had a thickness of 273 nm as measured by a Dektak XT stylus profilometer after scoring the coating with a razor blade.

Example 4-6 (EX4-6): Carbon Black Nano-Pigment, 70-80 nm Diameter, Back-Filled

Three sheets of microstructured film as made in PE1 were each cut to a size of 9"×10" and corona treated by hand using a BD-20AC Laboratory Corona Treater (Electro-Technic Products, Chicago, IL) to prevent the aqueous coating solutions from beading up and dewetting. PDAC and CAB-O-JET® 352K coating solutions were made as described in PE2. Separate 9"×10" pieces of the corona-treated films were coated with (PDAC/COJ352K)$_{20}$ (EX4), (PDAC/COJ352K)$_{40}$ (EX5), and (PDAC/COJ352K)$_{60}$ (EX6) using the "Method for Making Spray Layer-by-Layer Self-Assembled Coatings on Microstructured Film". The coated films were subjected to reactive ion etching (RIE) at a power of 6000 W for durations of 200 s (EX4) and 500 s (EX5 & EX6). Cross-sectional SEM images were taken of EX4, before and after RIE, but prior to back-filling. It was evident from the SEM images that the coating deposited on the film was of a uniform thickness and the thickness corresponded with the equivalent coating deposited onto glass, described below. Next, the channels were back-filled using the "Method for Back-Filling Channels of the Microstructured Film" described above. The luminance profile from a diffuse light source was measured using the "Method for Measuring the Luminance Profile from a Diffuse Light Source" above (data in FIG. 6 and Tables 5A and 5B). Equivalent coatings deposited onto glass plates had thicknesses of 273 nm (EX4), 536 nm (EX5), and 796 nm (EX6) as measured with a Dektak XT stylus profilometer after scoring the coatings with a razor blade. Based on the thickness of the equivalent coatings deposited on glass, the aspect ratios of the absorptive regions (e.g. louvers) ranged from approximately 109:1 (for EX6) to 319:1 (for EX4).

TABLE 5A

Relative brightness (RB) for EX2, EX4-EX6 and CE1-CE2.

| Ex. | # bilayers | % RB 0° viewing angle | % RB at +30° viewing angle | % RB at −30° viewing angle | Avg. % RB of +30° and −30° viewing angles |
|---|---|---|---|---|---|
| EX2 | 20 | 86.6 | 17.9 | 21.8 | 19.9 |
| EX4 | 20 | 91.0 | 21.6 | 19.4 | 20.5 |
| EX5 | 40 | 91.9 | 21.9 | 19.0 | 20.4 |
| EX6 | 60 | 91.0 | 17.8 | 14.8 | 16.3 |
| CE1 | N/A | 68.1 | 23.1 | 12.8 | 17.9 |
| CE2 | N/A | 64.3 | 13.6 | 4.8 | 9.2 |

TABLE 5B

Relative brightness (RB) for EX2, EX4-EX6 and CE1-CE2.

| Ex. | # bilayers | % RB 0° viewing angle | Average % RB for viewing angles from +35° to +80° | Average % RB for viewing angles from −35° to −80° | Average % RB for viewing angles from +35° to +80° and −35° to −80° |
|---|---|---|---|---|---|
| EX2 | 20 | 86.6 | 4.49 | 5.05 | 4.77 |
| EX4 | 20 | 91.0 | 5.12 | 4.82 | 4.97 |
| EX5 | 40 | 91.9 | 4.54 | 4.25 | 4.40 |
| EX6 | 60 | 91.0 | 3.14 | 3.01 | 3.08 |
| CE1 | N/A | 68.1 | 3.47 | 3.43 | 3.43 |
| CE2 | N/A | 64.3 | 1.56 | 1.06 | 1.31 |

TABLE 5C

Transmission of Ultraviolet and Near Infrared Light for EX6

| | UVA % T | | | NIR % T | | |
|---|---|---|---|---|---|---|
| Ex. | 0° | 30° | 60° | 0° | 30° | 60° |
| CE1 | 29.3 | 4.8 | 0.0 | 62.8 | 9.9 | 0.0 |
| EX6 | 56.8 | 3.6 | 0.04 | 74.9 | 4.3 | 0.3 |

Example 7 (EX7): Overlaid, Crossed Films

Two sections (each 3"×3") of the light control film prepared according to EX4 were overlaid, with the structured sides facing each other, with one sheet being oriented perpendicular to the other. That is, the original direction of the channels was offset by 90° between the top sheet and bottom sheet. Resin A was dispensed between the two sheets and the two sheets were laminated together with a hand roller. The sample was cured as described in the "Method for Back-Filling Channels of the Microstructured Film", and was measured using the "Method for Measuring the Luminance Profile from a Diffuse Light Source". Data are in Table 6A and 6B.

Example 8 (EX8): Overlaid, Aligned Films

Two sections (each 3"×3") of the light control film prepared according to EX4 were overlaid, with the structured sides facing each other, with one sheet being oriented parallel to the other. That is, the original direction of the channels was aligned between the top sheet and bottom sheet. Resin A was dispensed between the two sheets and the two sheets were laminated together with a hand roller. The sample was cured as described in the "Method for Back-Filling Channels of the Microstructured Film" and was measured using the "Method for Measuring the Luminance Profile from a Diffuse Light Source". Data are in Tables 6A-6D.

TABLE 6A

Relative brightness measured for EX7-EX8 and CE3.

| Ex. | % RB 0° viewing angle | % RB at +30° viewing angle | % RB at −30° viewing angle | Avg. % RB of +30° and −30° viewing angles |
|---|---|---|---|---|
| EX7 | 88.5 | 19.6 | 22.9 | 21.3 |
| EX8 | 90.6 | 5.13 | 7.69 | 6.41 |
| CE3 | 55.9 | 6.93 | 11.0 | 8.97 |

TABLE 6B

Relative brightness measured for EX7-EX8 and CE3.

| Ex. | % RB 0° viewing angle | Average % RB for viewing angles from +35° to +80° | Average % RB for viewing angles from −35° to −80° | Average % RB for viewing angles from +35° to +80° and −35° to −80° |
|---|---|---|---|---|
| EX7 | 88.5 | 4.48 | 4.97 | 4.73 |
| EX8 | 90.6 | 1.01 | 1.14 | 1.08 |
| CE3 | 55.9 | 0.68 | 0.93 | 0.81 |

TABLE 6C

Relative brightness measured for EX7-EX8 and CE3 at a 90° orientation angle.

| Ex. | % RB 0° viewing angle | % RB at +30° viewing angle | % RB at −30° viewing angle | Avg. % RB of +30° and −30° viewing angles |
|---|---|---|---|---|
| EX7 | 88.5 | 19.1 | 19.1 | 19.1 |
| EX8 | 90.6 | 90.4 | 88.9 | 89.6 |
| CE3 | 55.9 | 6.66 | 12.8 | 9.73 |

TABLE 6D

Relative brightness measured for EX7-EX8 and CE3 at a 90° orientation angle.

| Ex. | % RB 0° viewing angle | Average % RB for viewing angles from +35° to +80° | Average % RB for viewing angles from −35° to −80° | Average % RB for viewing angles from +35° to +80° and −35° to −80° |
|---|---|---|---|---|
| EX7 | 88.5 | 4.41 | 4.59 | 4.50 |
| EX8 | 90.6 | 80.6 | 78.5 | 79.5 |
| CE3 | 55.9 | 0.67 | 1.19 | 0.93 |

Example 9 (EX 9)

A light control film was prepared as described in EX. 1. During the method of back-filling the channels of the microstructured film, the top PET film was replaced with a color shifting film, as described by Example 1 of WO 2010/1090924. After UV curing this color shifting film was not stripped off, but instead retained as a cover film.

TABLE 7A

Relative brightness for EX9

| Ex. | % RB 0° viewing angle | Average % RB for viewing angles from +35° to +80° | Average % RB for viewing angles from −35° to −80° | Average % RB for viewing angles from +35° to +80° and −35° to −80° |
|---|---|---|---|---|
| EX9 | 120.6 | 20.7 | 3.7 | 4.0 |

The highly reflective color shifting film caused light recycling in the gain cube, resulting in the on-axis relative brightness being greater than 100%.

TABLE 7B

Transmission of Ultraviolet and Near Infrared Light for EX13

| Example | UV % T 0° | UV % T 30° | UV % T 60° | NIR % T 0° | NIR % T 30° | NIR % T 60° |
|---|---|---|---|---|---|---|
| EX 9 | 9.9 | 1.0 | 0.1 | 26.0 | 10.6 | 5.8 |

Surface Area of Absorptive Regions

The light input surface of CE2 was viewed with an optical microscope at 200× magnification. The maximum width of multiple absorptive regions (i.e., $W_A$ in FIG. 1a) and pitches (i.e., $P_A$ in FIG. 1a) were measured by analyzing the optical microscope images with ImageJ software (available from the National Institute of Health at the website http://imagej.nih.gov/ij). The average width of five absorptive regions was measured to be 14.7 microns. The average pitch was measured to be 64.9 microns. Thus, the ratio $W_A/P_A$ equals 0.227, or 22.7% of the surface area.

The light input surface of EX6 was viewed with an optical microscope at 200× magnification. The maximum width of multiple absorptive regions (i.e., $W_A$ in FIG. 1a) and pitches (i.e., $P_A$ in FIG. 1a) were measured by analyzing the optical microscope images with ImageJ software (available from the National Institute of Health at the website http://imagej.nih.gov/ij). The average width of five absorptive regions was measured to be 1.0 microns. The average pitch was measured to be 31.2 microns. When the wall angle is zero, the ratio $W_A/P_A$ equals 0.032, or 3.2% of the surface area. For the wall angle of 1.5 degrees, the surface area is 10.8%.

Examples 1-9, just described, can optionally be modified to include in at least one of the following: a light absorptive layer (e.g. cover film, base layer adhesive, coating) or a light reflective layer (e.g. diffusive layer) between the alternating absorptive and transmissive regions and the light output or input surface or a light absorptive material can be added to the material of the light transmissive regions.

Comparative Example 4 (CE4)

A dyed polyester film was prepared according to Example 1 in U.S. Pat. No. 9,630,384, except at a thickness of 1.5 mils (38 microns) to reach a visible light transmission level of 7% as measured with a Haze-Gard Plus (BYK-Gardner USA, Columbia, Maryland). A 3"×3" section of the dyed polyester top film was laminated to a 3"×3" piece of a commercially available privacy/light control film with an optically clear adhesive (8171, 3M Company, St. Paul, MN) using a hand roller.

Example 10 (EX 10)—LCF with PET Cover Film Comprising a Light Absorptive Dye A sheet of microstructured film as made in PE1 was each cut to a size of 9"×10" and corona treated by hand using a BD-20AC Laboratory Corona Treater (Electro-Technic Products, Chicago, IL). PDAC and CAB-O-JET® 352K coating solutions were made as described in PE2. A (PDAC/COJ352K)$_{60}$ coating was deposited onto the film using the "Method for Making Spray Layer-by-Layer Self-Assembled Coatings on Microstructured Film". An equivalent layer-by-layer coating deposited onto a glass plate had a thickness of 796 nm as measured by a Dektak XT stylus profilometer after scoring the coating with a razor blade. The coated film was subjected to reactive ion etching (RIE) at a power of 6000 W for a duration of 500 s. Next, the channels were back-filled using the "Method for Back-Filling Channels of the Microstructured Film" described above to produce a light control film.

A 3"×3" section of the dyed polyester film of CE4 was laminated to a 3"×3" piece of the light control film with an optically clear adhesive (8171, 3M Company, St. Paul, MN). The light transmission was measured as described above. The results are as follows:

The inclusion of the LCF increases the transmission at normal incidence (0 degree viewing angle) by 14% and reduces the UV and NIR transmission at viewing angle of 30° and 60°.

TABLE 8A

Relative brightness for EX 14 & CE4

| Example | % RB 0° viewing angle | % RB at +30° viewing angle | % RB at −30° viewing angle | Avg. % RB of +30° and −30° viewing angles |
|---|---|---|---|---|
| EX10 | 8.6 | 2.2 | 1.4 | 1.8 |
| CE4 | 6.8 | 1.2 | 0.5 | 0.9 |

TABLE 8B

Relative brightness for EX14 & CE4

| Ex. | % RB 0° viewing angle | Average % RB for viewing angles from +35° to +80° | Average % RB for viewing angles from −35° to −80° | Average % RB for viewing angles from +35° to +80° and −35° to −80° |
|---|---|---|---|---|
| EX10 | 8.6 | 0.3 | 0.2 | 0.3 |
| CE4 | 6.8 | 0.1 | 0.1 | 0.1 |

TABLE 8C

Transmission of Ultraviolet (UVA) and Near Infrared Light for EX14 & CE4

| | UV % T | | | NIR % T | | |
|---|---|---|---|---|---|---|
| Ex. | 0° | 30° | 60° | 0° | 30° | 60° |
| EX10 | 10.1 | 1.0 | 0.0 | 71.0 | 4.1 | 0.2 |
| CE4 | 7.1 | 0.9 | 0.0 | 57.0 | 7.8 | 0.0 |

PE3—Preparation of Adhesive

A base adhesive formulation was prepared as follows. 40 g of 2-ethylhexyl acrylate (Sigma-Aldrich, St. Louis, MO), 40 g of n-butyl acrylate (BASF Florham Park, NJ), 15 g of 2-hydroxyethyl acrylate (Kowa America New York, NY), 5 g of acrylamide (Zibo Xinye Chemical, Zibo City, CT), g of thermal initiator Vazo52 (Dupont (Wilmington, DE), 0.08 g of Karenz M T PE1 (Showa Denko America, New York, NY), and 60 g of Methyl Ethyl Ketone (MEK) solvent were charged to a reactor vessel. This vessel was sparged with nitrogen for 5 minutes, sealed, and then placed in an agitated water bath at 60° C. for 20 hours. The generated solution polymer was then cooled, sparged with air for 10 minutes, and 0.3 g of isocyanatol ethyl methacrylate (IEM available from Showa Denko America, New York, NY) was added to the vessel. The vessel was again sealed and heated to 50° C. for 12 hours to allow for the IEM to react with pendant OH functionality on the formed acrylic polymer. Following this functionalization, 0.4 g of Irgacure-184 (BASF Florham Park, NJ) and 8 g of CN983 (Sartomer, Exton, PA) were added to the vessel and mixed for 1 hour.

Example 11 (EX11)

Orasol Red 395 (BASF) was dissolved in MEK at 10 wt. %. One part of dye solution was mixed with 2 parts of the adhesive of PE3 to create a coating solution containing Orasol red 395 dye at 3.33 wt. %. This coating solution was coated onto the primed side of a PET film (the same PET film used in PE-1) with a #28 Mayer Rod (RDS Specialties, Webster, York) and dried in an oven at 150° F. for 6 minutes. The PET film, with the colored adhesive layer (23 microns), was laminated to a piece of light control film as described in EX2 using a Catena 65 roll laminator (available form GBC, Lake Zurich, IL) at 5 feet per minute and a 1 mm gap. The film appears red on-axis and black off-axis.

Example 12 (EX12)

Orasol Blue 825 (BASF) was dissolved in MEK at 10 wt. %. One part of dye solution was mixed with 2 parts of the adhesive of PE3 to create a coating solution containing Orasol Blue 825 dye at 3.33 wt. %. This coating solution was coated onto PET and laminated to a piece of film from EX2 as described in EX11 above. The film appears blue on-axis and black off-axis.

The light transmission of EX 11 and EX12 was measured as described above. The results are as follows:

TABLE 9A

Relative brightness for EX 15-EX 16

| Ex. | % RB 0° viewing angle | % RB at +30° viewing angle | % RB at −30° viewing angle | Average % RB for viewing angles from +35° to +80° | Average % RB for viewing angles from −35° to −80° |
|---|---|---|---|---|---|
| EX11 (red) | 13.1 | 2.5 | 2.4 | 0.60 | 0.60 |
| EX12 (blue) | 14.7 | 2.6 | 2.8 | 0.63 | 0.73 |

TABLE 9B

Transmission of Ultraviolet (UVA) and Near Infrared Light for EX15-EX16

| Example | UV % T | | | NIR % T | | |
|---|---|---|---|---|---|---|
| | 0° | 30° | 60° | 0° | 30° | 60° |
| EX11 (red) | 0.04 | 0.0 | 0.0 | 73.5 | 15.4 | 4.9 |
| EX12 (blue) | 3.4 | 0.3 | 0.0 | 65.4 | 18.4 | 9.0 |

The sheet resistance of Examples 1-12 can be increased by utilizing an organic polymer dispersion for at least some or all of the polyelectrolyte layers rather than a polyelectrolyte prepared and applied to the microstructured surface as an aqueous solution.

Preparation of Coatings from Organic Polymer Dispersions

SC20051 coating dispersion was made by diluting Sancure 20051 from 42.1 wt % to 1.0 wt % with deionized (DI) water and adding NaCl to a specified concentration.

SC20072 coating dispersion was made by diluting Sancure 20072 from 27.1 wt % to 1.0 wt % with DI water and adding NaCl to a specified concentration.

UCX214 coating dispersion was made by diluting Witcobond UCX-214 from 30.8 wt % to 1.0 wt % with DI water and adding NaCl to a specified concentration.

AC181 coating dispersion was made by diluting Picassian AC-181 from 39.7 wt % to 1.0 wt % with DI water and adding NaCl to a specified concentration.

RC65124 coating dispersion was made by diluting Raycat 65124 from 31 wt % to 1 wt % with DI water and adding NaCl to a specified concentration.

CC6 coating solution was made by diluting Dehyquart CC6 from 39.0 wt % to 0.32 wt % and adding NaCl to a concentration of 50 mM.

COJ200 and COJ300 coatings suspensions were made by diluting CAB-O-JET 200 and 300, respectively, from 20.0 wt and 15.0 wt %, respectively, to concentrations of 1.0 wt % with DI water. NaCl was added to each to a concentration of 50 mM.

Example 13

A sheet of microstructured film as made in PE1 was cut to a size of 9"×10". SC20051 coating dispersion and COJ200 coating suspension were made as described above. The concentration of NaCl in the SC20051 was 200 mM NaCl. The corona-treated film and adjacent glass uncovered glass plate were coated with $(SC20051/COJ200)_{12}$ using the "Method for Making Spray Layer-by-Layer Self-Assembled Coatings on Microstructured Film". The sheet resistance of the coating present on the glass plate adjacent to the microstructured film was measured via the "Method for Measuring Sheet Resistance of Coatings on Glass". The coated film was subjected to reactive ion etching (RIE) until a plateau in on-axis % T was reached. Next, the channels were back-filled using the "Method for Back-Filling Channels of the Microstructured Film" described above. EX1 had a 3 mil PET film laminated on top after backfilling, so total thickness of the article was about 10.5 mils. When the article was placed on the screen of a commercially available smartphone, the touchscreen was functional and not notably impacted. Visible light transmission of the coatings on glass, thickness of the coatings on glass, weight percent carbon black in the coating, and sheet resistance of the coatings on glass are in Table 1. Touchscreen response with the louver film is also in Table 1. The luminance profile of the louver film was measured using the "Method for Measuring the Luminance Profile from a Diffuse Light Source", and data are in Tables 2-3.

Examples 14-19 were Prepared and Tested in the Same Manner Using Different Coating Dispersions/Suspensions as Described as Follows Example 14-15

SC20072 and COJ200 coating dispersions/suspensions were made as described above. The concentration of NaCl in the SC20072 was 100 mM NaCl for EX2 and 200 mM NaCl for EX3. The corona-treated film and adjacent glass uncovered glass plate were coated with $(SC20072/COJ200)_{12}$ using the "Method for Making Spray Layer-by-Layer Self-Assembled Coatings on Microstructured Film".

Example 16

SC20051 and COJ300 coating dispersions/suspensions were made as described above. The concentration of NaCl in the SC20051 was 200 mM NaCl. The corona-treated film and adjacent glass uncovered glass plate were coated with (SC20051/COJ300)$_{10}$ using the "Method for Making Spray Layer-by-Layer Self-Assembled Coatings on Microstructured Film". EX4 had the top film stripped off, so total thickness of the article was about 7.5 mils.

Example 17

UCX214 and COJ200 coating dispersions/suspensions were made as described in above. The concentration of NaCl in the UCS214 was 100 mM NaCl. The corona-treated film and adjacent glass uncovered glass plate were coated with (UCX214/COJ200)$_{10}$ using the "Method for Making Spray Layer-by-Layer Self-Assembled Coatings on Microstructured Film".

Example 18

A sheet of microstructured film as made in PE1 was cut to a size of 9"×10". AC181 and COJ200 coating dispersions/suspensions were made as described above. The concentration of NaCl in the AC181 was 200 mM NaCl. The corona-treated film and adjacent glass uncovered glass plate were coated with (AC181/COJ200)$_{12}$ using the "Method for Making Spray Layer-by-Layer Self-Assembled Coatings on Microstructured Film".

Example 19

A sheet of microstructured film as made in PE1 was cut to a size of 9"×10". RC65124 and COJ200 coating dispersions/suspensions were made as described above. The concentration of NaCl in the RC65124 was 100 mM NaCl. The corona-treated film and adjacent glass uncovered glass plate were coated with (RC65124/COJ300)$_{10}$ using the "Method for Making Spray Layer-by-Layer Self-Assembled Coatings on Microstructured Film".

Comparative Example 5 (CE5)

A sheet of microstructured film as made in PE1 was cut to a size of 9"×10". CC6 coating solution and COJ300 coating suspension were made as described in above. The concentration of NaCl in the CC6 solution was 50 mM NaCl. The corona-treated film and adjacent glass uncovered glass plate were coated with (CC6/COJ300)$_{10}$ using the "Method for Making Spray Layer-by-Layer Self-Assembled Coatings on Microstructured Film".

Method for Measuring the Visible Light Transmission of a Coating on Glass

Visible light transmission was measured with a BYK (Geretsried, Germany) HazeGard Plus instrument.

Method for Measuring Thickness of a Coating on Glass

Thickness was measured with a Dektak XT stylus profilometer (Bruker Nano Inc., Tucson, Arizona) after scoring the coating with a razor blade Method for Measuring Sheet Resistance of Coatings on Glass Sheet resistance of coatings on a planar glass substrate was measured with a Trek (Lockport, New York) Model 152 Resistance Meter.

Method for Determining Weight Percent of Carbon Black in the Coatings

Coatings on glass were scraped off with a razor blade. The samples were analyzed using the TA Instruments Discovery Thermogravimetric Analyzer (TGA) in HiRes mode. Each sample was subjected to a heating profile ranging from room temperature (~35° C.) to 700° C. in a nitrogen atmosphere, with a linear heating rate of 20.0° C./min and a resolution setting of 4.0. Under these conditions, the instrument heats the sample until weight loss is detected, at which point the temperature stabilizes until weight loss diminishes, and then heating recommences. At 700° C. the atmosphere was then switched to air and the HiRes heating ramp was continued to 800° C. Weight percent carbon black was calculated by subtracting the weight % residue in air at 800° C. from the weight % residue in nitrogen at 700° C.

Method for Assessing Touch Performance on an Apple iPhone 8

The touch performance of films prepared in the Examples was evaluated by placing the films on the screen of an iPhone8, qualitatively assessing touch responsiveness as follows:

Pass—same touch screen responsiveness as without the film on the screen.

Fail—touch screen responsiveness did not work with the film on the screen.

TABLE 10

Visible light transmission, thickness and sheet resistance of the coatings on glass and touchscreen response of the louver films

| Example | Visible Light Transmission of Coating on Glass | Thickness of Coating on Glass (nm) | Weight Percent Carbon Black in the Coating | Sheet Resistance of Coating on Glass (Ω/square) | Touch Response on Commercial Smartphone |
|---|---|---|---|---|---|
| EX13 | 3.5% | 556 | 63.0 | 2.1E+09 | Pass |
| EX14 | 7.4% | 435 | 47.4 | 2.3E+08 | Pass |
| EX15 | 7.4% | 574 | 32.4 | 4.6E+10 | Pass |
| EX16 | 3.8% | 546 | | 2.2E+07 | Pass |
| EX17 | 4.4% | 565 | | 2.7E+09 | Pass |
| EX18 | 3.4% | 626 | | 1.4E+09 | Pass |
| EX19 | 11.2% | 645 nm | | 3.7E+09 | Pass |
| CE5 | 5.0% | 387 | | 5.7E+05 | Fail |

TABLE 11

Relative brightness (RB) of louver film at a 0° orientation angle.

| Ex. | % RB 0° viewing angle | % RB at +30° viewing angle | % RB at −30° viewing angle | Avg. % RB of +30° and −30° viewing angles |
|---|---|---|---|---|
| EX13 | 92.1 | 13.6 | 14.0 | 13.8 |
| EX16 | 91.7 | 10.8 | 16.4 | 13.6 |
| CE5 | 92.5 | 17.1 | 15.8 | 16.4 |

TABLE 12

Relative brightness (RB) of louver film at a 0° orientation angle.

| Ex. | % RB 0° viewing angle | Average % RB for viewing angles from +35° to +80° | Average % RB for viewing angles from −35° to −80° | Average % RB for viewing angles from +35° to +80° and −35° to −80° |
|---|---|---|---|---|
| EX13 | 92.1 | 2.31 | 2.34 | 2.33 |
| EX16 | 91.7 | 2.01 | 2.66 | 2.33 |
| CE5 | 92.5 | 3.77 | 3.56 | 3.67 |

What is claimed is:

1. A light control film, comprising:
a light input surface and a light output surface opposite the light input surface;
alternating transmissive regions and absorptive regions disposed between the light input surface and the light output surface, wherein the absorptive regions comprise light-absorbing or light-reflecting particles and a dried aqueous dispersion of an organic polymer.

2. The light control film of claim 1 wherein the organic polymer is insoluble in water.

3. The light control film of claim 1 wherein the organic polymer is soluble in tetrahydrofuran.

4. The light control film of claim 1 wherein the absorptive regions have a sheet resistance of greater than $1\times10^7$, $5\times10^7$, $1\times10^8$, $5\times10^8$, or $1\times10^9$ ohms/square.

5. The light control film of claim 1 wherein the organic polymer comprises an acrylic polymer, a urethane polymer, or a combination thereof.

6. The light control film of claim 1 wherein the light-absorbing particles are electrically conductive.

7. The light control film of claim 1 wherein the light-absorbing particles comprise carbon.

8. The light control film of claim 1 wherein the light-absorbing particles have a median particle size of less than 500 nanometers.

9. The light control film of claim 1 wherein the absorptive regions comprise at least 25 wt.-% of light-absorbing particles.

10. The light control film of claim 1 wherein the organic polymer has d50 or d90 median particle size ranging from 20 to 300 nm.

11. The light control film of claim 10 wherein the organic polymer has a d50 median particle size less than 200, 175, 150, 125, 100, 75, or 50 nm.

12. The light control film of claim 10 wherein the organic polymer has a d10 median particle size of less than 150, 125, 100, 75, or 50 nm.

13. The light control film of claim 10 wherein particles of the organic polymer are coalesced.

14. The light control film of claim 13 wherein the light absorbing or reflecting particles are spaced apart by a distance corresponding to the particle size of the organic polymer.

15. The light control film of claim 1 wherein the organic polymer and light absorbing or light reflecting particles comprise oppositely charged ionic groups.

16. The light control film of claim 1 wherein the absorptive regions have an aspect ratio of at least 30, 50, 100, 200, 300, 400, 500, 600, 700, 800 or 1000.

17. The light control film of claim 1 wherein the alternating transmissive region and absorptive regions have a transmission of visible, UV or NIR wavelength of light at a viewing angle of 0 degrees of at least 75%.

* * * * *